(12) United States Patent (10) Patent No.: US 8,210,731 B2
Iwasaki (45) Date of Patent: Jul. 3, 2012

(54) LIGHT GUIDE PLATE, AND PLANAR LIGHTING DEVICE AND LIQUID CRYSTAL DISPLAY DEVICE USING THE SAME

(75) Inventor: Osamu Iwasaki, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 1243 days.

(21) Appl. No.: 10/588,935

(22) PCT Filed: Feb. 18, 2005

(86) PCT No.: PCT/JP2005/003087
§ 371 (c)(1),
(2), (4) Date: Aug. 9, 2006

(87) PCT Pub. No.: WO2005/080863
PCT Pub. Date: Sep. 1, 2005

(65) Prior Publication Data
US 2007/0165422 A1 Jul. 19, 2007

(30) Foreign Application Priority Data
Feb. 20, 2004 (JP) ................................. 2004-045463

(51) Int. Cl.
*F21V 7/04* (2006.01)
(52) U.S. Cl. .................... 362/615; 362/625; 362/628
(58) Field of Classification Search .............. 362/97, 362/561, 614, 615, 625, 628; 349/62, 65, 349/70; 385/901
See application file for complete search history.

(56) References Cited

U.S. PATENT DOCUMENTS

| | | | | |
|---|---|---|---|---|
| 5,034,864 A | * | 7/1991 | Oe | 362/224 |
| 5,402,324 A | * | 3/1995 | Yokoyama et al. | 362/19 |
| 6,923,554 B2 | * | 8/2005 | Kuo | 362/223 |
| 2003/0210210 A1 | * | 11/2003 | Ide et al. | 345/30 |

FOREIGN PATENT DOCUMENTS

| | | |
|---|---|---|
| JP | 5-249320 A | 9/1993 |
| JP | 05249320 A * | 9/1993 |

(Continued)

OTHER PUBLICATIONS

Taiwanese Office Action for Taiwanese Patent Application No. 094104747, Sep. 2, 2011.

*Primary Examiner* — Anabel Ton
*Assistant Examiner* — Danielle Allen
(74) *Attorney, Agent, or Firm* — Sughrue Mion, PLLC

(57) ABSTRACT

The transparent light guide plate includes a rectangular light exit surface, a thick portion positioned at substantially a central portion of the surface, thin edge portions formed in parallel on both sides of the thick portion, a parallel groove accommodating a bar-like light source and being formed at substantially a center of the thick portion and inclined rear portions whose thickness is reduced from the thick portion toward the thin edge portions. An end portion of the groove is narrowed toward the surface symmetrically to a center line of the groove in a sectional shape thereof according to a ratio of a peak value of illuminance or luminance of emitted light at a first portion of the surface corresponding to the groove to an average value thereof at second portions corresponding to the inclined rear portions. The planar lighting device includes the light guide plate. The liquid crystal display device includes the planar lighting device.

26 Claims, 12 Drawing Sheets

FOREIGN PATENT DOCUMENTS

| | | |
|---|---|---|
| JP | 8-62426 A | 3/1996 |
| JP | 8-271886 A | 10/1996 |
| JP | 09265074 A * | 10/1997 |
| JP | 9-304623 A | 11/1997 |
| JP | 09304623 A * | 11/1997 |
| JP | 10082915 A | 3/1998 |
| JP | 10-133027 A | 5/1998 |
| JP | 11-149073 A | 6/1999 |
| JP | 11149073 A * | 6/1999 |
| JP | 2004-302067 | 10/2004 |

* cited by examiner

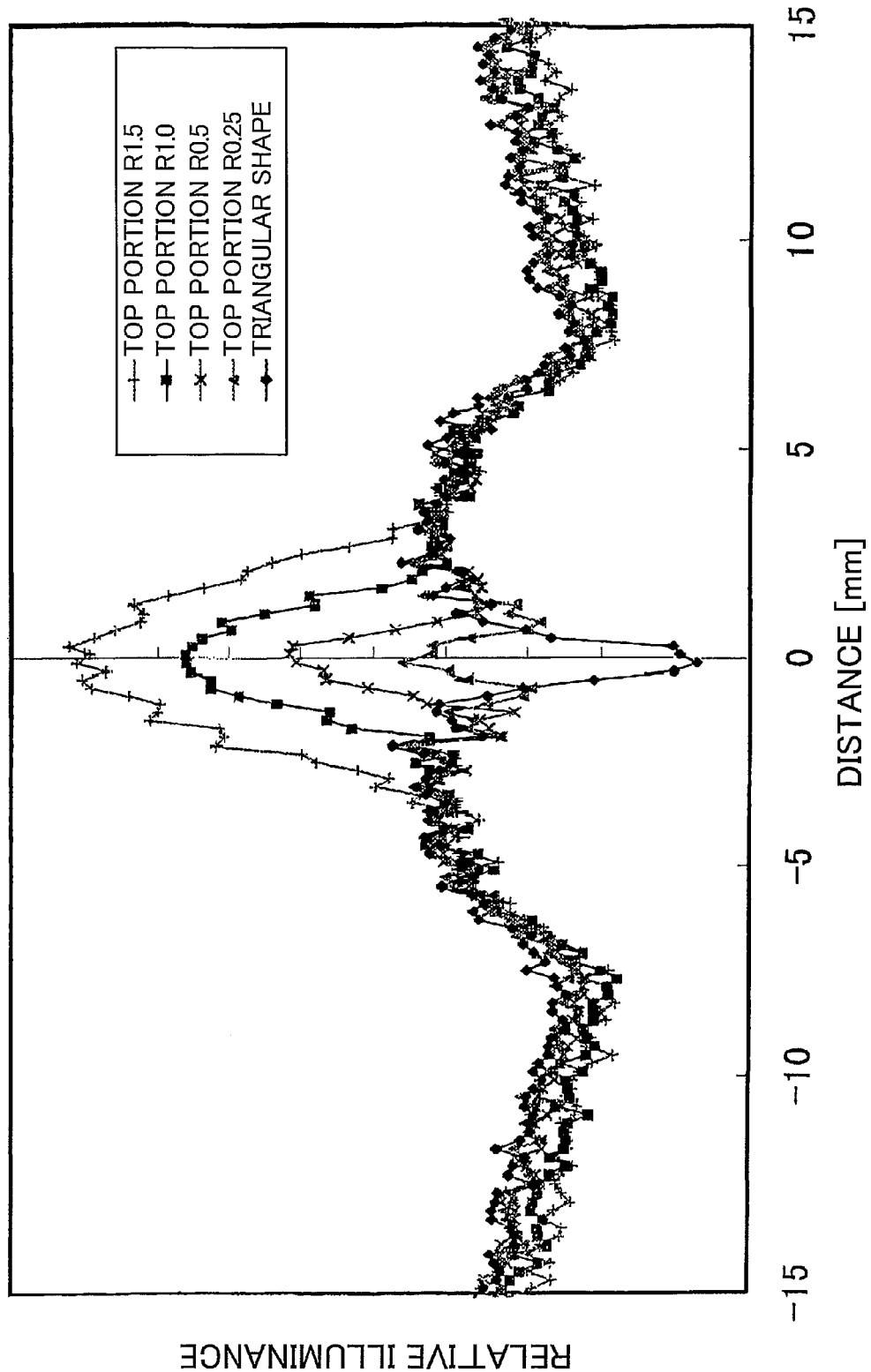

FIG.17
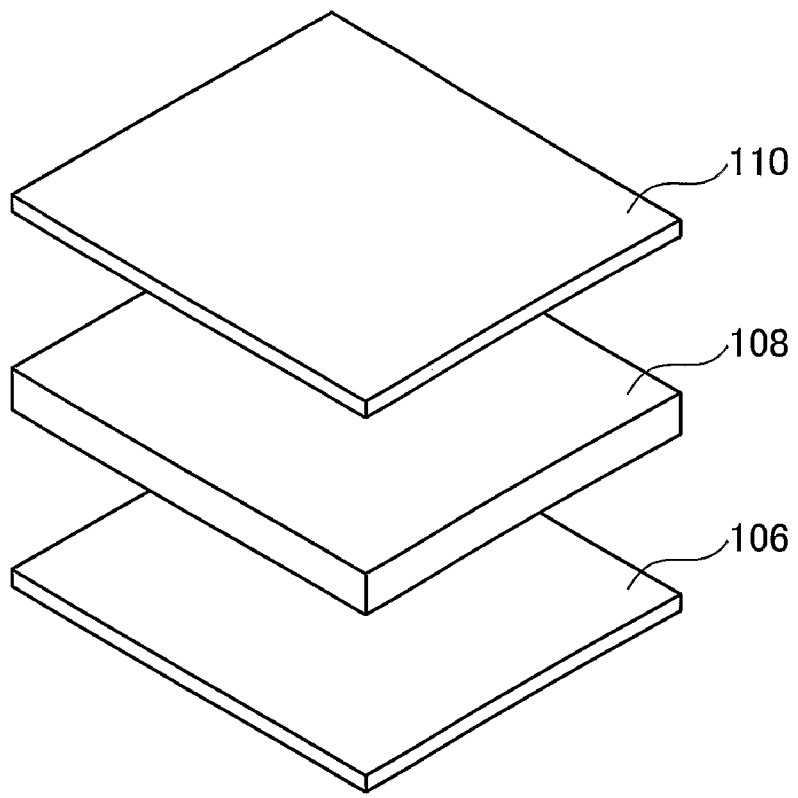
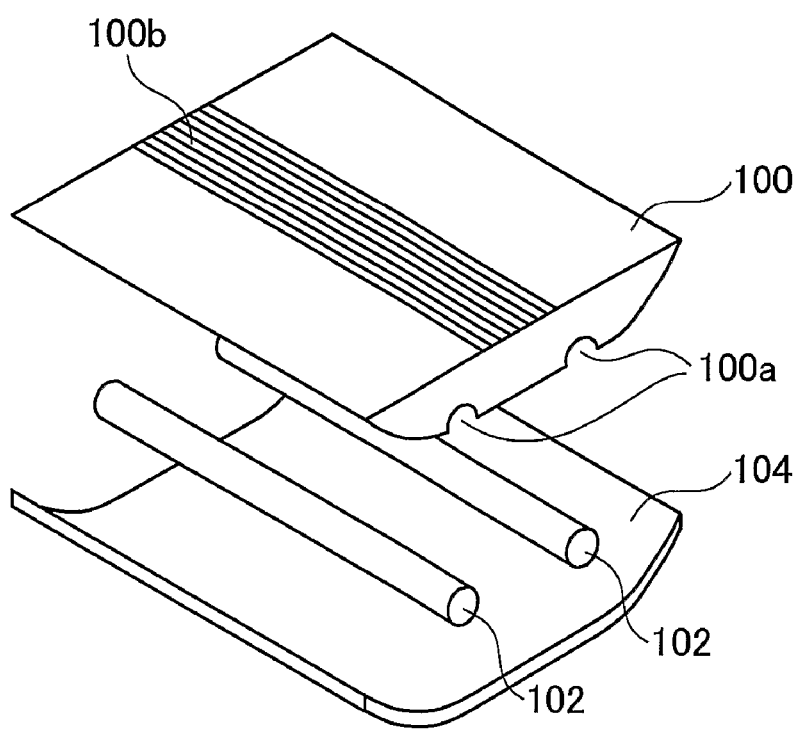

LIGHT GUIDE PLATE, AND PLANAR LIGHTING DEVICE AND LIQUID CRYSTAL DISPLAY DEVICE USING THE SAME

TECHNICAL FIELD

The present invention relates to a transparent light guide plate for diffusing incident light from a bar-like light source in directions parallel to a light exit surface of the light guide plate and emitting evener illumination light from the light exit surface, and a planar lighting device and a liquid crystal display device using the same.

BACKGROUND

A liquid crystal display device is provided with a backlight unit for irradiating a liquid crystal panel (LCD) with light from its rear side and illuminating the liquid crystal panel. The backlight unit includes an illuminating light source, a light guide plate that diffuses light emitted from the light source to irradiate the liquid crystal panel with the light, a prism sheet or diffusion sheet for equalizing the light emitted from the light guide plate and other such components.

In recent years, there is an increasing demand for reduction in thickness and power consumption of a liquid crystal display device. To meet such a demand, light guide plates of various shapes have been proposed (refer to JP 9-304623 A, JP 8-62426 A, JP 10-133027 A, and JP 5-249320 A)

FIG. 17 is a schematic sectional diagram of an area light source device including a light guide plate 100 disclosed in JP 9-304623 A.

The area light source device (backlight unit) shown in FIG. 17 is obtained by embedding a fluorescent lamp 102 in the light guide plate 100, then arranging a reflective sheet 104 on a rear surface of the light guide plate 100 and laminating a transmitted light amount correction sheet 106, a light diffuser 108, and a prism sheet 110 on a light exit surface of the light guide plate 100.

The light guide plate 100 has a substantially rectangular shape and is made of a resin into which fine particles functioning to diffuse illumination light are dispersed. Also, the light guide plate 100 has a flat upper surface, which is used as the light exit surface. Further, grooves 100a each having a U shape in section are formed in the rear surface (surface opposite to the light exit surface) of the light guide plate 100. The fluorescent lamp 102 is fitted into each groove. A light amount correction surface 100b for promoting the emission of illumination light is formed except portions just above the fluorescent lamps 102.

As mentioned above, JP 9-304623 A describes that, the fine particles are mixed into the resin to form the light guide plate 100 and in addition, the illumination light is promoted to exit by the light amount correction surface 100b formed on a part or all of the light exit surface except the portions just above the fluorescent lamps 102, making it possible to reduce the total thickness and unnatural and uneven luminance of the light emitted from the light guide plate 100.

For the purpose of obtaining a backlight of a liquid crystal display device, which enables reduction in size, weight, and thickness of the liquid crystal display device as well as cost and power consumption without reducing the illumination amount of the backlight, JP 8-62426 A discloses a light guide plate having a rectangular illumination surface, a groove rectangular in section which is gouged out at a central portion with respect to the short sides in parallel with the long sides and in which a light source is inserted, and a rear surface formed such that a plate thickness is gradually reduced from the groove toward both lateral surfaces on the long sides.

In addition, for the purpose of obtaining a backlight unit that enables a thin frame and reduction of the total thickness of a liquid crystal display device, and is high in use efficiency and luminance, JP 10-133027 A discloses a light guide member (light guide plate) having a parabolic shape in section along the width direction of a concave portion where the light source is arranged, with the depth direction being a major axis.

Further, JP 5-249320 A discloses a light guide plate where plural plate-like optical waveguide layers are laminated so as to have successively increased refractive indexes on a high reflectance layer arranged in substantially a V shape, and light emitted from each light exit surface illuminates a light diffusion layer for the purpose of maintaining even in-plane brightness of a display panel and attaining high-luminance illumination. Here, a concave portion where the light source is arranged has a triangular shape.

The light guide plates disclosed in the patent documents mentioned above aim at some of slimness, reduction in size and weight, low power consumption, and low cost. In any of the plates, one or more grooves are formed at the central portion, and the bar-like light source is accommodated in the groove. The plates are preferably designed such that the plate thickness is gradually reduced from the groove portion toward the end surfaces, thus attaining the reduction in thickness.

DISCLOSURE OF THE INVENTION

However, with the light guide plate 100 disclosed in JP 9-304623 A, the light amount correction surface 100b such as a rough surface or microprism surface is formed on the light exit surface except the portions just above the light sources (fluorescent lamps) 102, thereby promoting the emission of illumination light incident at an angle not smaller than a critical angle with respect to the light exit surface. However, as shown in FIG. 18, the luminance N2 of the illumination light from the light guide plate 100 having the light amount correction surface 100b (indicated by a solid line) is improved only a little with respect to the luminance N1 of the illumination light from the light guide plate which has no light amount correction surface (indicated by a dotted line). This means that an effect of improving the luminance by use of the light amount correction surface 100b is small, the use efficiency of light from the light source is low, and the light from the light source shows insufficient diffusion. As a result, a problem arises in that high-luminance even light cannot be emitted from the light exit surface.

Also, in the light guide plate 100 disclosed in JP 9-304623 A, the light sources (fluorescent lamps) 102 are embedded in the grooves 100a each having a circular sectional shape. As shown in FIG. 18, the luminance peaks attributable to the light sources 102 remain as they are, which causes a problem in that prior to the use as the area light source device, the transmitted light amount correction sheet 106, the light diffuser 108, the prism sheet 110, etc. need to be provided to eliminate unnatural and uneven luminance on the light exit surface, leading to an increased cost of the area light source device.

Further, in the backlight of the liquid crystal display device disclosed in JP 8-62426 A, parts mounted on an electronic circuit board are arranged in a gap formed by inclining the rear surface of the light guide plate, enabling cost reduction, low power consumption, and reduction in size and weight of the liquid crystal display device, but no consideration is given to the unevenness of the illumination light emitted from the light exit surface of the light guide plate.

Besides, in the backlight unit of the liquid crystal display device disclosed in JP 10-133027 A, the concave portion formed in a groove form in the light guide member (light guide plate) has a parabolic sectional shape, so light can enter the light guide member while being diffused almost evenly in the light guide member, enhancing the use efficiency of the light. However, no consideration is given to the unevenness of the light emitted from the light exit surface of the light guide member.

In addition, the light guide plate disclosed in JP 5-249320 A has a complicated structure where plural plate-like optical waveguide layers are laminated, and hence as compared with a conventional one, luminance attenuation can be suppressed to thereby obtain even luminance and attain an excellent illumination effect, which however involves a problem in high manufacturing cost.

A first object of the present invention is to provide a light guide plate with which the above-mentioned problems of the conventional techniques are solved, and which is thin and lightweight, and is capable of emitting evener illumination light having higher luminance from a light exit surface.

Another object of the present invention is to provide a light guide plate that allows a larger-size light edit surface in addition to the first object.

A second object of the present invention is to provide a planar lighting device with which the above-mentioned problems of the conventional techniques are solved, and which is thin and lightweight, can be manufactured at a lower cost and emit evener illumination light having higher luminance, and allows a larger-size light exit surface, or is applicable to a liquid crystal display device such as a wall-hung TV.

A third object of the present invention is to provide a liquid crystal display device with which the problems of the conventional techniques are solved, and which is thin and lightweight, can be manufactured at a lower cost, enables evener display with higher luminance, and allows a larger-size display screen, or can be hung on a wall like a wall-hung TV.

The inventor of the present invention has made intensive studies in order to attain the first object, more specifically with a view to obtaining a light guide plate which is thin and lightweight, and is capable of emitting evener illumination light having higher luminance from its light exit surface, and in which the size of the light exit surface can be made larger. As a result, it has been found that slimming down and weight reduction are possible by a transparent light guide plate which includes a rectangular light exit surface, a thick portion positioned at substantially a central portion in parallel with opposing two sides, thin edge portions formed in parallel on both sides of the thick portion, inclined rear portions whose thickness is reduced from the thick portion toward the thin edge portions to form inclined rear surfaces, and a parallel groove which is formed parallel in the thick portion to accommodate a bar-like light source, and that upsizing of the light exit surface is also possible by connecting plural light guide plates at their thin edge portions. It has been also found that the illuminance or luminance of light emitted from the bar-like light source accommodated in the parallel groove has a peak at a first portion of the light exit surface corresponding to the parallel groove, leading to uneven illumination or luminance; that the peak of the illuminance or luminance can be reduced by narrowing or tapering the parallel groove toward its end portion closer to the light exit surface, the illuminance or luminance can have a negative peak by sharpening the top of the end portion, and the negative peak of the illuminance or luminance can be reduced by forming the top of the end portion of the parallel groove less sharply, to be more specific by chamfering or rounding; and that the degree to which the peak of the illuminance or luminance is reduced depends on the degree to which the end portion of the parallel groove is narrowed or tapered. The inventor has thus achieved the present invention.

In order to attain the first object described above, the first mode of the first aspect of the present invention provides a transparent light guide plate, comprising a rectangular light exit surface, a thick portion positioned at substantially a central portion of the rectangular light exit surface in parallel with opposing two sides of the rectangular light exit surface, thin edge portions formed in parallel on both sides of the thick portion, a parallel groove which accommodates a bar-like light source and is formed at substantially a center of the thick portion in parallel with the opposing two sides, and inclined rear portions which are symmetrical with respect to a plane including a central axis of the bar-like light source and perpendicular to the rectangular light exit surface, and whose thickness is reduced from the thick portion toward the thin edge portions in a direction perpendicular to the opposing two sides to thereby form inclined rear surfaces on both sides of the parallel groove, wherein an end portion of the parallel groove is narrowed toward the rectangular light exit surface symmetrically with respect to a center line of the parallel groove perpendicular to the rectangular light exit surface in a sectional shape of the parallel groove in the direction perpendicular to the rectangular light exit surface, in accordance with a ratio of a peak value of illuminance or luminance of emitted light from the bar-like light source accommodated in the parallel groove at a first portion of the rectangular light exit surface corresponding to the parallel groove to an average value of the illuminance or luminance of the emitted light at second portions corresponding to the inclined rear portions.

Preferably, the end portion of the parallel groove is symmetrically narrowed such that a peak value of relative illuminance or relative luminance at the first portion of the rectangular light exit surface is three or less times as large as an average value of the relative illuminance or relative luminance at the second portions of the rectangular light exit surface.

In order to attain the first object described above, the second mode of the first aspect of the present invention provides a transparent light guide plate, comprising a rectangular light exit surface, a thick portion positioned at substantially a central portion of the rectangular light exit surface in parallel with opposing two sides of the rectangular light exit surface, thin edge portions formed in parallel on both sides of the thick portion, a parallel groove which accommodates a bar-like light source and is formed at substantially a center of the thick portion in parallel with the opposing two sides, and inclined rear portions which are symmetrical with respect to a plane including a central axis of the bar-like light source and perpendicular to the rectangular light exit surface, and whose thickness is reduced from the thick portion toward the thin edge portions in a direction perpendicular to the opposing two sides to thereby form inclined rear surfaces on both sides of the parallel groove, wherein an end portion of the parallel groove is narrowed toward the rectangular light exit surface symmetrically with respect to a center line of the parallel groove perpendicular to the rectangular light exit surface in a sectional shape of the parallel groove in the direction perpendicular to the rectangular light exit surface, in such a manner that a peak value of illuminance or luminance of emitted light from the bar-like light source accommodated in the parallel groove at a first portion of the rectangular light exit surface corresponding to the parallel groove is three or less times as large as an average value of the illuminance or luminance of the emitted light at a second portion corresponding to the inclined rear portions.

It is preferable in the first and second modes of the first aspect described above that the peak of relative illuminance or relative luminance at the first portion of the rectangular light exit surface is twice or less as large as the average value of the relative illuminance or relative luminance at the second portion of the rectangular light exit surface.

Preferably, the end portion forms an angle of 90 degrees or less, the angle being obtained by combining two angles between both sides of the sectional shape of the parallel groove and a perpendicular line extending from a center of the bar-like light source toward the rectangular light exit surface.

Preferably, the end portion forms an angle of 60 degrees or less, the angle being obtained by combining two angles between both sides of the sectional shape of the parallel groove and a perpendicular line extending from a center of the bar-like light source toward the rectangular light exit surface.

Preferably, the sectional shape of at least the end portion of the parallel groove is defined by part of two straight or curved lines symmetrical with respect to the center line of the parallel groove, which cross each other at an intersection as a peak.

Preferably, the two curved lines defining the sectional shape of at least the end portion of the parallel groove are convex or concave with respect to the center line of the parallel groove.

Preferably, the two curved lines defining the sectional shape of at least the end portion of the parallel groove can be approximated by a tenth-order mathematical function and are convex or concave with respect to the center line of the parallel groove.

Preferably, the two curved lines defining the sectional shape of at least the end portion of the parallel groove or the sectional shape of the parallel groove comprise part of circular, elliptical, parabolic, or hyperbolic lines, which are convex or concave with respect to the center line of the parallel groove.

Preferably, the sectional shape of at least the end portion of the parallel groove or the sectional shape of the parallel groove is triangular.

Preferably, the sectional shape at a top of the end portion of the parallel groove is defined by the two straight or curved lines symmetrical with respect to the center line cross each other and a straight or curved line symmetrical with respect to the center line which is connected to the two straight or curved lines before the two straight or curved lines cross each other.

Preferably, the sectional shape at the top of the end portion of the parallel groove has a portion parallel with the rectangular light exit surface where the intersection as the peak is chamfered.

Preferably, the sectional shape of at least the end portion of the parallel groove or the sectional shape of the parallel groove is triangular, and the sectional shape at the top of the end portion of the parallel groove is a trapezoidal shape symmetrical with respect to the center line.

Preferably, the sectional shape at the top of the end portion of the parallel groove is a curved shape symmetrical with respect to the center line and convex or concave with respect to the rectangular light exit surface.

Preferably, the sectional shape at the top of the end portion of the parallel groove is a circular, elliptical, parabolic, or hyperbolic shape obtained by rounding the intersection as the peak symmetrically with respect to the center line.

Preferably, the sectional shape of at least the end portion of the parallel groove is defined by part of a elliptical or hyperbolic line.

Preferably, the top of the end portion of the parallel groove is sanded.

Preferably, a halftone dot pattern is formed in a portion of the rectangular light exit surface corresponding to the top of the end portion of the parallel groove.

In order to attain another object described above, the third mode of the first aspect of the present invention provides a light guide plate formed from two or more light guide plates according to any one of the above light guide plates, which are connected with each other at the thin edge portions thereof.

In order to attain the second object described above, the second aspect of the present invention provides a planar lighting device comprising a light guide plate according to any one of the above first aspect, a bar-like light source accommodated in the parallel groove of the light guide plate, a reflector provided behind the bar-like light source to cover the parallel groove, a reflective sheet provided on the inclined rear surfaces of the inclined rear portions on both sides of the thick portion of the light guide plate, and a diffusion sheet arranged on the rectangular light exit surface of the light guide plate.

It is preferable that the planar lighting device further comprises a prism sheet arranged between the rectangular light exit surface of the light guide plate and the diffusion sheet.

Preferably, a ratio of a peak value of relative illuminance or luminance at a first portion of the rectangular light exit surface of the light guide plate to an average value of relative illuminance or luminance at a second portion of the rectangular light exit surface is determined in accordance with a permissible gap between the rectangular light exit surface of the light guide plate and the diffusion sheet, or a permissible thickness of the planar lighting device.

In order to attain the third object described above, the third aspect of the present invention provides a liquid crystal display device, comprising a backlight unit including a planar lighting device according to any one of the above second aspect, a liquid crystal display panel arranged on a light exit surface side of the backlight unit, and a drive unit driving the backlight unit and the liquid crystal display panel.

According to the first aspect of the present invention, it is possible to make a thin and lightweight light guide plate which emits evener illumination light having higher luminance from the light exit surface.

Further, according to the first mode of the first aspect of the present invention, a sectional shape of the parallel groove is designed as a narrowed shape or a tapered shape toward the end portion closer to the light exit surface according to the ratio of the peak value of illuminance or luminance of the light emitted from the bar-like light source accommodated in the parallel groove at the first portion of the light exit surface corresponding to the parallel groove to the average value of the illuminance or luminance at other portions, whereby the peak of the illuminance or luminance can be lowered, the illuminance or luminance on the light exit surface can be made evener, and the evenness required of the light exit surface can be attained.

Further, according to the second mode of the first aspect of the present invention, a sectional shape of the parallel groove is designed as a narrowed or tapered shape toward the end portion closer to the light exit surface such that the peak value of illuminance or luminance at the first portion of the light exit surface is three or less times as large as the average value of the illuminance or luminance on other portions, whereby the peak of the illuminance or luminance can be lowered, and the illuminance or luminance on the light exit surface can be made evener.

Further, according to the third mode of the first aspect of the present invention, the thin edge portions of the light guide plates according to the first or second mode are connected to each other, whereby the size of the light exit surface of the light guide plate can be made larger.

Further, according to the second aspect of the present invention, using the light guide plate according to the first aspect makes it possible to provide a thin and lightweight planar lighting device, which can be manufactured at lower cost and emit evener illumination light with higher luminance, which allows a large-size illumination surface, and which is applicable to a liquid crystal display device such as a wall-hung TV.

Further, according to the third aspect of the present invention, using the planar lighting device according to the second aspect makes it possible to provide a thin and lightweight liquid crystal display device, which can be manufactured at lower cost and ensures evener display with higher luminance and which allows a larger-size display screen or can be hung on a wall such as a wall-hung TV.

BRIEF DESCRIPTION OF DRAWINGS

FIG. 13 is a graph showing an illuminance distribution of light emitted from a light exit surface of a light guide plate when the deepest portion of a parallel groove is formed into a curved shape having a radius of curvature R and the radius of curvature of the curved surface is variously changed;

FIG. 17 is a schematic sectional view of an area light source device having a conventional light guide plate.

BEST MODE FOR CARRYING OUT THE INVENTION

Hereinafter, a light guide plate, and a planar lighting device and a liquid crystal display device using the light guide plate according to the present invention will be described in detail based on preferred embodiments shown in the accompanying drawings.

Figure 1A:
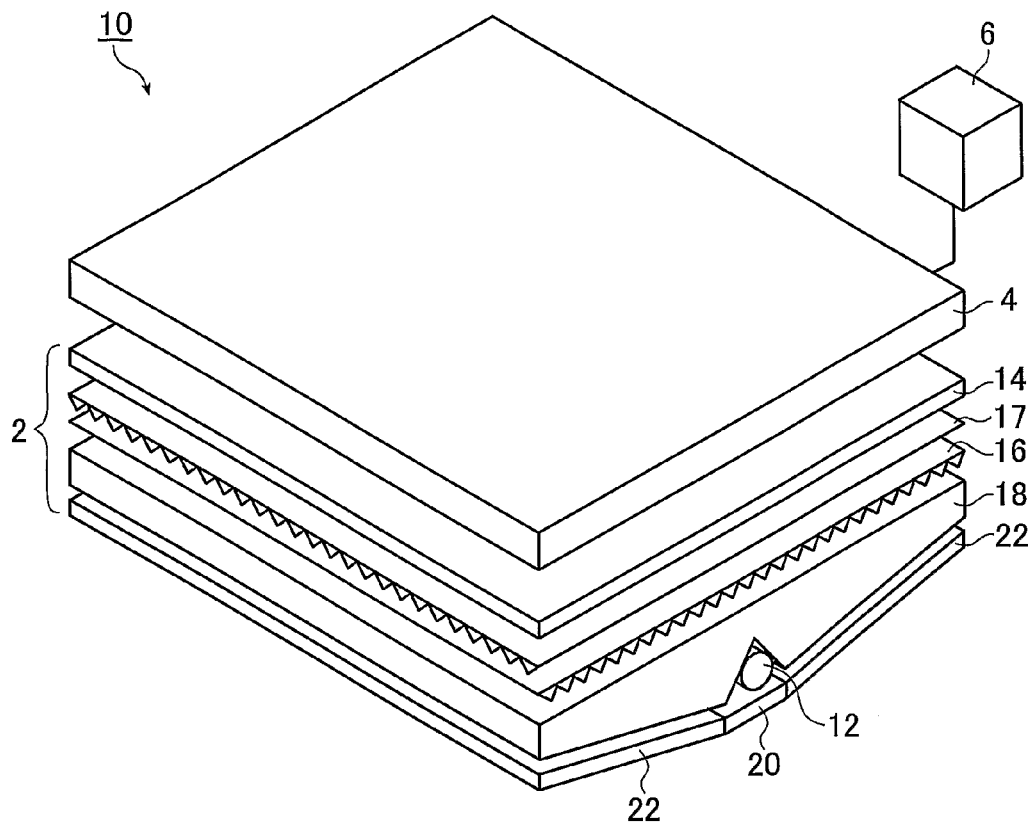
FIGS. 1A and 1B are a schematic perspective view and a schematic sectional view of a liquid crystal display device using a backlight unit including a light guide plate according to the present invention, respectively.
Figure 1B:
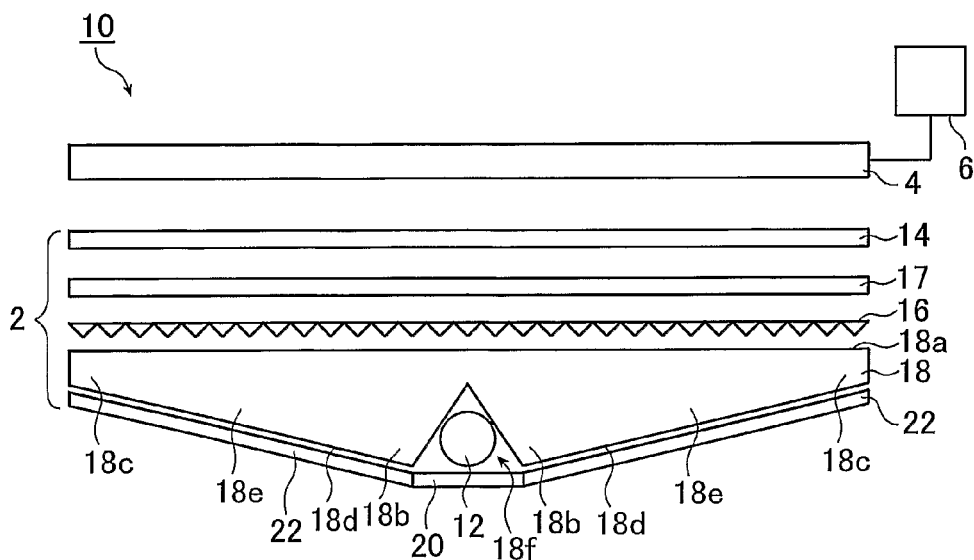

FIGS. 1A and 1B are a schematic perspective view and a schematic sectional view of a liquid crystal display device according to a third aspect of the present invention, which uses as a backlight unit, a planar lighting device according to a second aspect of the present invention, which includes a light guide plate according to a first aspect of the present invention. As shown in FIGS. 1A and 1B, a liquid crystal display device 10 basically includes a backlight unit 2, a liquid crystal display panel 4 disposed on a light exit surface side of the backlight unit 2, and a drive unit 6 for driving those components.

The backlight unit 2 is a planar lighting device or illuminator for evenly irradiating the entire surface of the liquid crystal display panel 4 with light from its rear side, and has a light exit surface (light emitting surface) having substantially the same size as an image display surface of the liquid crystal display panel 4. The backlight unit 2 is, as shown in FIGS. 1A and 1B, basically provided with a light source 12, a diffusion sheet 14, two prism sheets 16 and 17, a light guide plate 18, a reflector 20, and a reflective sheet 22.

The light source 12 is a bar-like cold-cathode tube having a small diameter, which is used for illuminating the liquid crystal display panel 4. The light source 12 is arranged inside a parallel groove 18f formed in the light guide plate 18 and connected to the drive unit 6. In this example, the light source 12 is the cold-cathode tube, but the present invention is not limited to this, and any bar-like light source can be used. The light source 12 may be, for example, an ordinary fluorescent tube or an LED (light emitting diode).

In FIGS. 1A and 1B, the diffusion sheet 14 diffuses light emitted from a light exit surface 18a of the light guide plate 18 to make the light even, and is formed by imparting light diffusion property to a plate-like member made of an optically transparent resin, for example, PET (polyethylene terephthalate), PP (polypropylene), PC (polycarbonate), PMMA (polymethyl methacrylate), benzyl methacrylate or MS resin, other acrylic resins, or COP (cycloolefin copolymer). The method of forming the sheet is not particularly limited, but for example, the sheet is formed by imparting the light dispersion property through finely embossing, polishing or otherwise processing the surface of the plate-like member to obtain a roughened surface (hereinafter, the treated surface is referred to as "sanded surface" or "sand-rubbed surface"), by applying to the surface, a material that allows light to be scattered over the surface, as exemplified by a pigment such as silica, titanium oxide, or zinc oxide, a resin, or beads of glass or zirconium together with a binder, or by kneading the aforementioned resin with the pigment or beads that allow the light to be scattered in the resin. In the present invention, a mat or coating type diffusion sheet can be used as the diffusion sheet 14.

In the present invention, the diffusion sheet 14 is also preferably a film-like member made of the above material, having a thickness of 500 μm or less, and exhibiting the light diffusion property.

The diffusion sheet 14 is preferably arranged at a predetermined distance from the light exit surface 18a of the light guide plate 18, and the distance can be appropriately changed according to the light amount distribution of light from the light exit surface 18a of the light guide plate 18. By placing the diffusion sheet 14 at the predetermined distance from the light exit surface 18a of the light guide plate 18 as described above, the light emitted from the light exit surface 18a of the light guide plate 18 is further subjected to mixing between the light exit surface 18a and the diffusion sheet 14. Thus, the illuminance of the light illuminating the liquid crystal display panel 4 after having passed through the diffusion sheet 14 can be made evener. In order to dispose the diffusion sheet 14 at a predetermined distance from the light exit surface 18a of the light guide plate 18, a spacer may be provided between the diffusion sheet 14 and the light guide plate 18, for example.

In particular, if the thickness of the backlight unit 2 can be increased a little, the peak value of the illuminance on the light exit surface 18a of the light guide plate 18 corresponding to the parallel groove 18f does not need to be reduced sufficiently in accordance with the sectional shape of the parallel groove 18f of the light guide plate 18. It is possible to partially reduce the value and ensure a gap between the diffusion sheet 14 and the light exit surface 18a of the light guide plate 18 to obtain an even illuminance distribution of illumination light emitted from the diffusion sheet 14. Also, due to a limitation on improvements in sectional shape of the parallel groove 18f of the light guide plate 18 (narrowing or tapering of the end portion of the parallel groove), if the peak value of the illuminance on the light exit surface 18a of the light guide plate 18 corresponding to the parallel groove 18f cannot be completely or sufficiently reduced, a gap may be provided between the diffusion sheet 14 and the light exit surface 18a of the light guide plate 18 to thereby obtain the even illuminance distribution of the illumination light emitted from the diffusion sheet 14.

The prism sheets 16 and 17 are transparent sheets formed by arranging plural prisms in parallel, which enhance condensing property of light emitted from the light exit surface 18a of the light guide plate 18 to improve luminance. A prism array of one of the prism sheets 16 and 17 extends in a direction parallel with the parallel groove 18f of the light guide plate 18, while a prism array of the other thereof extends in a direction perpendicular thereto. That is, the prism sheets 16 and 17 are arranged such that the directions in which the prism arrays extend cross at right angles. Further, the prism sheet 16 is arranged such that the vertex of each prism faces the light exit surface 18a of the light guide plate 18. Here, regarding the arrangement order of the prism sheets 16 and 17, the prism sheet 16 having prisms arranged in parallel with the parallel groove 18f of the light guide plate 18 may be arranged just above the light guide plate 18, and the prism sheet 17 having prisms arranged in the direction perpendicular to the parallel groove 18f of the light guide plate 18 on the prism sheet 16, and vice versa.

Also, in the illustrated example, the prism sheet is used. Instead of the prism sheet, a sheet on which optical elements like the prism are regularly arranged may be used. Further, a sheet on which elements each having a lens effect, for example, lenticular lens, concave lens, convex lens, or pyramid type optical elements are regularly arranged may replace the prism sheet.

Figure 2A:
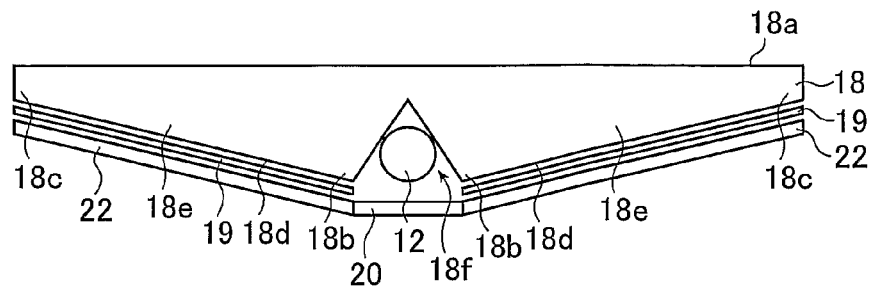
FIG. 2A is a schematic sectional view showing how a prism sheet is sandwiched between a reflective sheet and an inclined surface of the light guide plate.
Figure 2B:
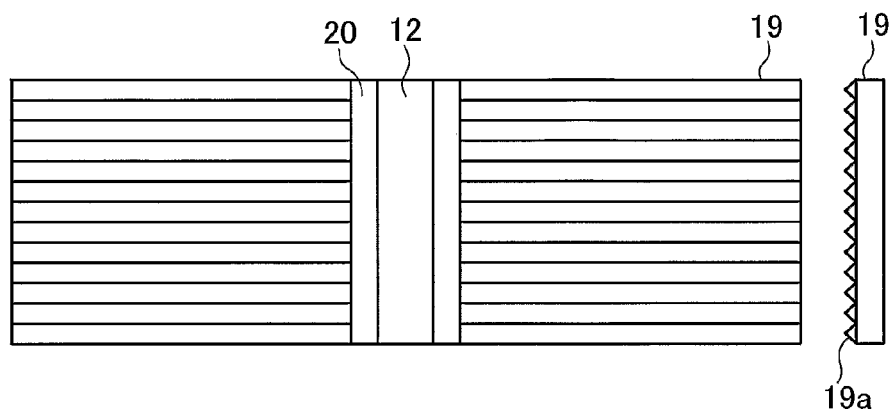
FIG. 2B shows in schematic plan view and schematic cross-sectional view the prism sheet sandwiched between the reflective sheet and the inclined surface of the light guide plate as viewed from the light guide plate side.

In the present invention, as shown in FIGS. 2A and 2B, it is preferable to additionally interpose a prism sheet 19 between the reflective sheet 22 and an inclined surface 18d opposite to the light exit surface 18a of the light guide plate 18. FIG. 2A is a schematic sectional view showing how the prism sheet 19 is arranged between the reflective sheet 22 and the inclined surface 18d of the light guide plate 18. FIG. 2B shows in schematic plan view and schematic cross-sectional view the prism sheet 19 interposed between the reflective sheet 22 and the inclined surface 18d of the light guide plate 18 as viewed from the light guide plate side. The prism sheet 19 interposed between the reflective sheet 22 and the inclined surface 18d of the light guide plate 18 is preferably arranged such that prisms 19a extend in a direction perpendicular to the parallel groove 18f of the light guide plate 18, and the vertex of each prism 19a faces the inclined surface 18d of the light guide plate 18.

Here, the prism sheet is used, but it is possible to use an optical element having the similar effect to that of the prism sheet. For example, a sheet on which optical elements having the lens effect such as lenticular lens, concave lens, convex lens, or pyramid type optical elements are regularly arranged may be arranged.

Note that in the illustrated example, the prism sheets 16 and 17, and more preferably the prism sheet 19 are used, but if the illuminance on the light exit surface 18a determined by the parallel groove 18f of the light guide plate 18 is made evener, it is possible to dispense with, of course, the prism sheet 19, and with one or both of the prism sheets 16 and 17. Reducing the number of expensive prism sheets used or dispensing with the prism sheets enables reduction in apparatus cost.

In FIG. 1B, the reflective sheet 22 reflects light leaking from the rear surface (lower surface in FIG. 1B) of the light guide plate 18 to let the reflected light enter the light guide plate 18 again, making it possible to use the light more efficiently. The reflective sheet 22 covers the lower surface (inclined surface) of the light guide plate 18. The reflector 20 is disposed behind the light source 12 so as to block the parallel groove 18f of the light guide plate 18. The reflector 20 reflects the light from the lower surface of the light source 12 to make the reflected light enter the light guide plate 18 through sidewall surfaces of the parallel groove 18f thereof.

The reflective sheet 22 may be formed of any material insofar as the material is capable of reflecting the light leaking from the rear surface (lower surface in FIG. 1B) of the light guide plate 18. It is possible to form the sheet using, for example, a resin sheet whose reflectivity is enhanced by kneading PET, PP, etc. with a filler and then drawing the resultant mixture to thereby form voids, a sheet obtained by mirror-finishing a transparent or white resin sheet surface through vapor deposition of aluminum or the like, a metal foil such as an aluminum foil or a resin sheet having the metal foil, or a metal thin plate whose surface has sufficient reflectivity. Also, the reflector 20 can be formed using the same material as the reflective sheet 22, that is, a resin material whose surface has sufficient reflectivity, the metal foil, or the metal plate.

Referring to FIG. 1B, the light guide plate 18 includes the rectangular light exit surface 18a, a thick portion 18b extending parallel with opposing two sides of the plate 18, thin edge portions 18c formed at both sides of the thick portion 18b also extending parallel with the two sides, inclined rear portions 18e having the inclined surfaces 18d formed by reducing the thickness from the thick portion 18b toward the thin edge portions 18c in a direction perpendicular to the two sides, and the parallel groove 18f which accommodates the light source 12 and is formed in the thick portion 18b parallel with the two sides. That is, the light guide plate 18 is a flat plate having a rectangular shape and formed of a transparent resin. In the light guide plate 18, one surface is made flat, while the other surface is inclined with respect to the one surface such that the plate thickness is reduced toward the two sides. Here, the inclined surfaces 18d are flat but may be curved.

The parallel groove 18f for accommodating the light source 12 extends in a longitudinal direction in the thick portion 18b of the light guide plate 18 opposite to the light exit surface 18a. The depth of the parallel groove 18f is preferably determined so as to prevent part of the light source 12 from protruding from the lower surface of the light guide plate 18. The depth is preferably determined in consideration of the size of the light source 12, mechanical strength of the light guide plate 18, and the change with time. Also, the thicknesses of the thick portion 18b or thin edge portions 18c of the light guide plate 18 can be changed arbitrarily in accordance with the size of the light source 12. Here, the parallel groove 18f of the light guide plate 18 may be formed in a direction perpendicular to the longitudinal direction of the light guide plate 18, but preferably in the longitudinal direction for using more efficiently the light from the light source 12 accommodated in the parallel groove 18f.

In the light guide plate 18 structured as shown in FIGS. 1A and 1B, part of the light emitted from the light source 12 arranged in the parallel groove 18f enters the inner portion of the light guide plate 18 through the sidewalls forming the parallel groove 18f, is reflected on the inclined surfaces 18d of the light guide plate 18 and then exits from the light exit surface 18a. At this time, part of the light leaks from the lower surface of the light guide plate 18, but the leaked light is reflected on the reflective sheet 22 formed on the inclined surface 18d side of the light guide plate 18 to enter the inner portion of the light guide plate 18 again, and then exits from the light exit surface 18a. Thus, the light is evenly emitted from the light exit surface 18a of the light guide plate 18.

For example, the light guide plate 18 can be prepared by a method of molding a heated material resin through extrusion or injection molding, or a casting polymerization method for molding through polymerization of a monomer, an oligomer or the like in a mold. A material for the light guide plate 18 may be a transparent resin, for example selected from an acrylic resin such as PMMA, PET, PP, PC, benzyl methacrylate, MS resin, other acrylic resins and COP. The transparent resin may be mixed with fine particles for scattering light, and the efficiency of light emitted from the light exit surface 18a can be further improved.

Figure 3:
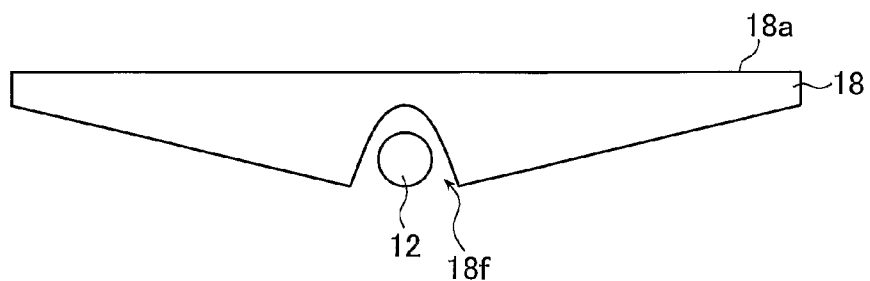
FIG. 3 is a schematic sectional view of a light guide plate in the case where a section taken along a direction perpendicular to the longitudinal direction of a parallel groove has a hyperbolic shape.
Figure 4:
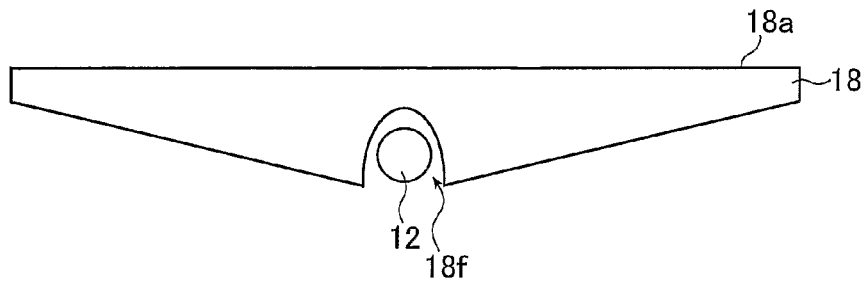
FIG. 4 is a schematic sectional view of a light guide plate in the case where a section taken along a direction perpendicular to the longitudinal direction of a parallel groove has an elliptical shape.

In FIGS. 1A and 1B, the parallel groove 18f of the light guide plate 18 is formed into a triangular shape in section taken along a direction perpendicular to the longitudinal direction of the parallel groove 18f (hereinafter referred to simply as sectional shape of the parallel groove). Here, the sectional shape of the parallel groove 18f is triangular, but in the present invention, the parallel groove 18f may have any sectional shape that is symmetrical with respect to a center line passing through the deepest portion or center of the parallel groove 18f and extending vertically with respect to the light exit surface 18a of the light guide plate 18, and is narrowed or tapered toward the light exit surface 18a. For example, as shown in FIGS. 3 and 4, a hyperbolic or elliptical sectional shape may be adopted. Alternatively, the parallel groove 18f of the light guide plate 18 may have a catenarian sectional shape.

Further, in the present invention, the parallel groove may have such a sectional shape that the deepest portion of the parallel groove (joint of sidewalls constituting the parallel groove) forms a vertex. More specifically, the parallel groove can take a sectional shape in its end portion, which is defined by part of two curved or straight lines crossing at an intersection as a peak, these lines being symmetrical with respect to the center line passing trough the center of the parallel groove and extending vertically with respect to the light exit surface of the light guide plate. In the present invention, the parallel groove of the light guide plate having any of the above sectional shapes allows the light emitted from the light exit surface of the light guide plate to be made even.

Figure 5:
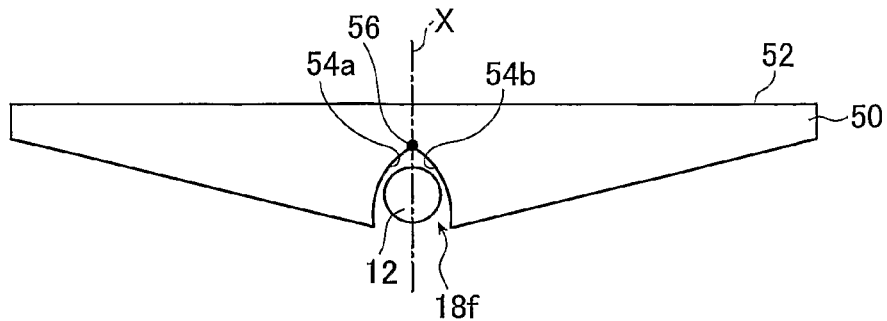
FIG. 5 is a schematic sectional view of a light guide plate where a sectional shape along a direction perpendicular to the longitudinal direction of a parallel groove is defined by a part of two arcuate curved lines symmetrical with respect to a center line passing through the center of the parallel groove and extending vertically with respect to a light exit surface of the light guide plate.

FIG. 5 shows a case where the parallel groove 18f takes the sectional shape at its end portion, which is defined by part of two curved lines crossing at an intersection as a peak, these lines being symmetrical with respect to the center line passing trough the center of the parallel groove 18f and extending vertically with respect to the light exit surface of the light guide plate. In a light guide plate 50 shown in FIG. 5, used are two arcuate curved lines 54a and 54b symmetrical with respect to the center line X passing through the center of the parallel groove and extending vertically with respect to a light exit surface 52 of the light guide plate 50. In this case, as shown in FIG. 5, center positions of the arcuate line 54a corresponding to one sidewall forming the parallel groove 18f and the arcuate line 54b corresponding to the other sidewall are shifted from each other, so a portion 56 where the arcuate sidewalls intersect each other forms a peak as shown in FIG. 5.

Figure 6:
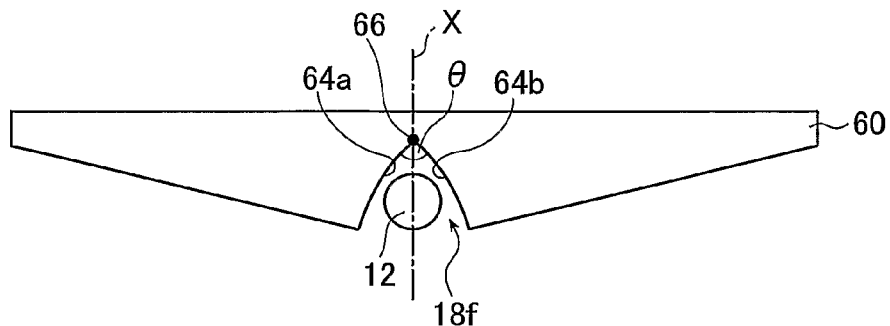
FIG. 6 is a schematic sectional view of a light guide plate where a sectional shape along a direction perpendicular to the longitudinal direction of a parallel groove is defined by a part of two parabolic curved lines symmetrical with respect to a center line passing through the center of the parallel groove and extending vertically with respect to a light exit surface of the light guide plate.

Further, FIG. 6 shows another case where the parallel groove 18f takes the sectional shape at its end portion, which is defined by part of two curved lines crossing at an intersection as a peak, these lines being symmetrical with respect to the center line passing trough the center of the parallel groove 18f and extending vertically with respect to the light exit surface of the light guide plate. In a light guide plate 60 shown in FIG. 6, used are two parabolic curved lines 64a and 64b symmetrical with respect to the center line X passing through the center of the parallel groove 18f and extending vertically with respect to the light exit surface of the light guide plate. In FIG. 6, the sidewalls of the parallel groove 18f are formed in such a way that focal points of the parabolic line 64a corresponding to one sidewall forming the parallel groove 18f and parabolic line 64b corresponding to the other sidewall 22b are shifted from each other.

As shown in FIG. 6, when the parallel groove has a sectional shape at its end portion, which is defined by the two curved lines 64a and 64b crossing at an intersection 66, an angle θ between the tangent at the intersection (peak) 66 of the curved line 64a corresponding to one sidewall of the parallel groove 18f and the tangent at the intersection 66 of the curved line 64b corresponding to the other sidewall is preferably 90 degrees or less, more preferably 60 degrees or less.

Figure 7:
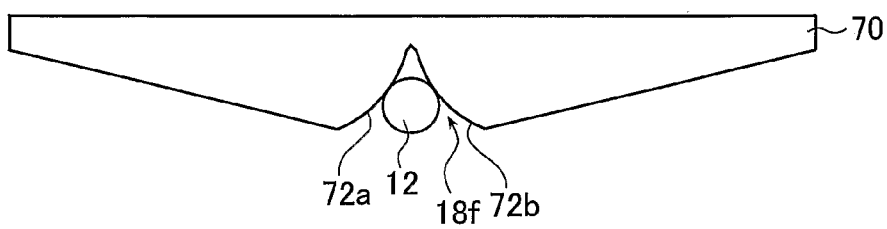
FIG. 7 is a schematic sectional view of a light guide plate where a sectional shape along a direction perpendicular to the longitudinal direction of a parallel groove is defined by two curved lines convex with respect to the center of the parallel groove.
Figure 8:
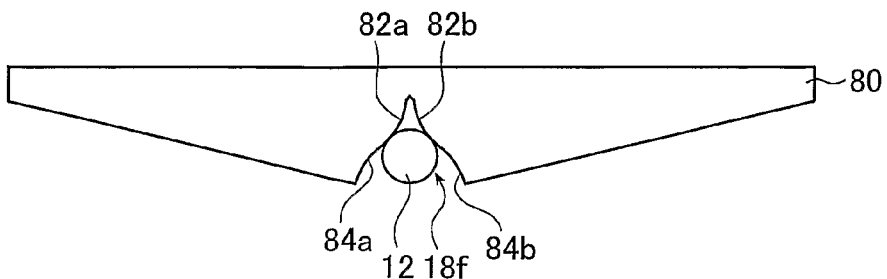
FIG. 8 is a schematic sectional view of a light guide plate where a sectional shape along a direction perpendicular to the longitudinal direction of a parallel groove is defined by a combination of curved lines convex and concave with respect to the center of the parallel groove.

FIGS. 1A to 6 each show an example of the light guide plate where the curved lines forming the sidewalls of the parallel groove are concave with respect to the center of the parallel groove in the sectional shape of the parallel groove, while FIGS. 7 and 8 show other forms of the light guide plates of the present invention which are different from the light guide plates described above. FIG. 7 shows an example of a light guide plate 70 where the parallel groove 18f has a sectional shape defined by two curved lines 72a and 72b convex with respect to the center of the parallel groove 18f. FIG. 8 shows an example of a light guide plate 80 where the parallel groove 18f has a sectional shape defined by a combination of convex curved lines 82a and 82b and concave curved lines 84a and 84b with respect to the center of the parallel groove 18f. It is also possible to emit light with sufficient illuminance from the light exit surface while suppressing generation of emission lines by using the light guide plates 70 and 80 having the parallel grooves with the sectional shapes as shown in FIGS. 7 and 8, respectively.

In this way, according to the present invention, in the sectional shape of the parallel groove of the light guide plate, portions corresponding to the parallel groove may be formed into a curved or straight shape convex or concave with respect to the center of the parallel groove, or a combination thereof may be used. Those curved lines are not limited to arcuate lines of the illustrated example, but may be part of curved lines, for example, elliptical, parabolic, or hyperbolic curved lines convex or concave with respect to the center of the parallel groove. Further, in the present invention, any sectional shape may be adopted for the end portion of the parallel groove insofar as the end portion is narrowed or tapered as described below. For example, the curved lines forming the parallel groove may be part of curved lines, for example, circular, elliptical, parabolic, or hyperbolic curved lines convex or concave with respect to the center of the parallel groove. It is preferable to use curved lines that can be approximated by a tenth-order mathematical function.

Figure 9:
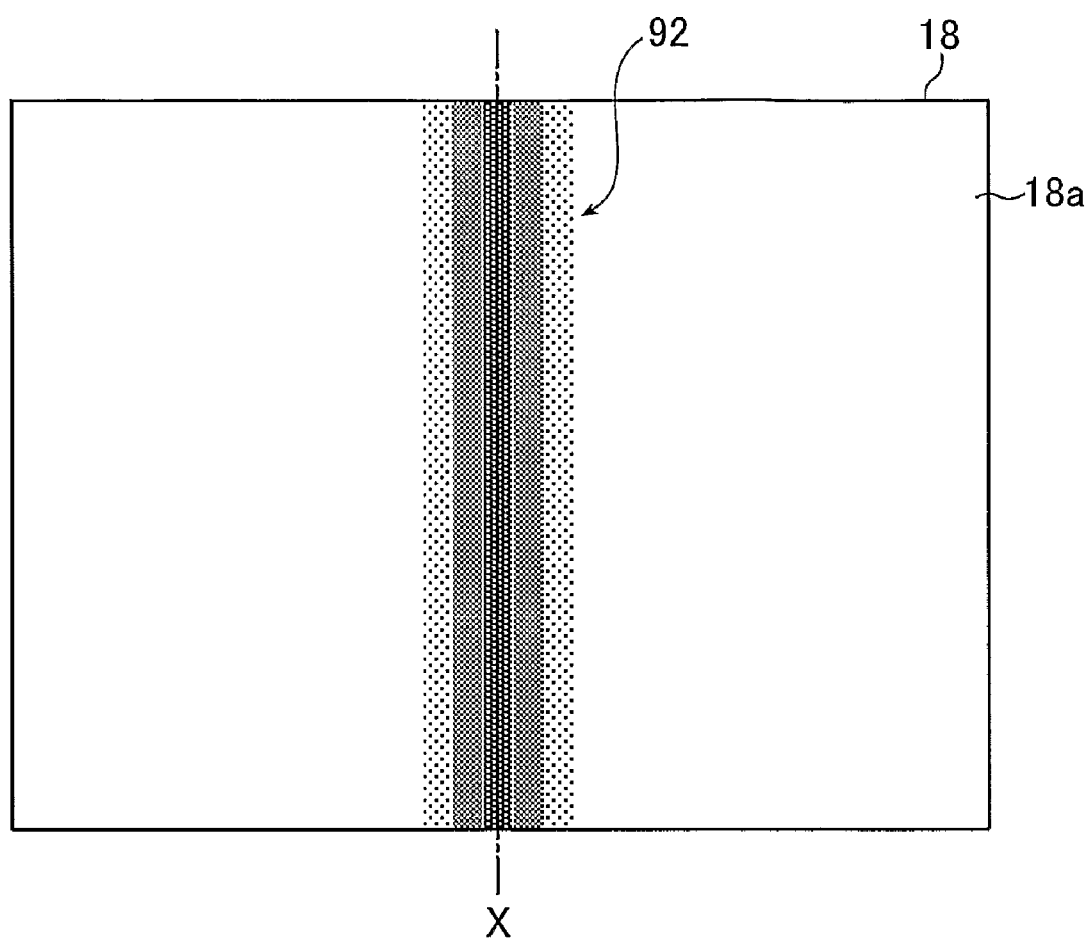
FIG. 9 shows an example of a halftone dot pattern formed on a light exit surface side of a light guide plate.

In the light guide plate of the present invention, as shown in FIG. 9, a halftone dot pattern 92 where halftone dot density is high at a given center line X, and is decreased from the center line X toward both sides thereof (in a direction perpendicular to the center line) may be formed on the light exit surface 18a of the light guide plate 18 by printing, for example. The halftone dot pattern 92 is formed such that the center line X of the halftone dot pattern coincides with the position corresponding to the center line of the parallel groove of the light guide plate 18. Thus, it is possible to suppress the generation of emission lines on the light exit surface 18a of the light guide plate 18 or light unevenness. Also, instead of printing the halftone dot pattern 92 on the light guide plate 18, a thin sheet having the halftone patterns formed thereon may be laminated on the light exit surface 18a. The halftone dot may be of any shape such as a rectangular, circular, or elliptical shape. The halftone dot density may be appropriately selected according to the intensity or spread of emission lines. Also, instead of forming such a halftone dot pattern through printing, a portion corresponding to the halftone dot pattern may be made rough as a sanded surface. Such a sanded surface may be formed at the deepest portion or sidewall of the parallel groove of the light guide plate.

Figure 10:
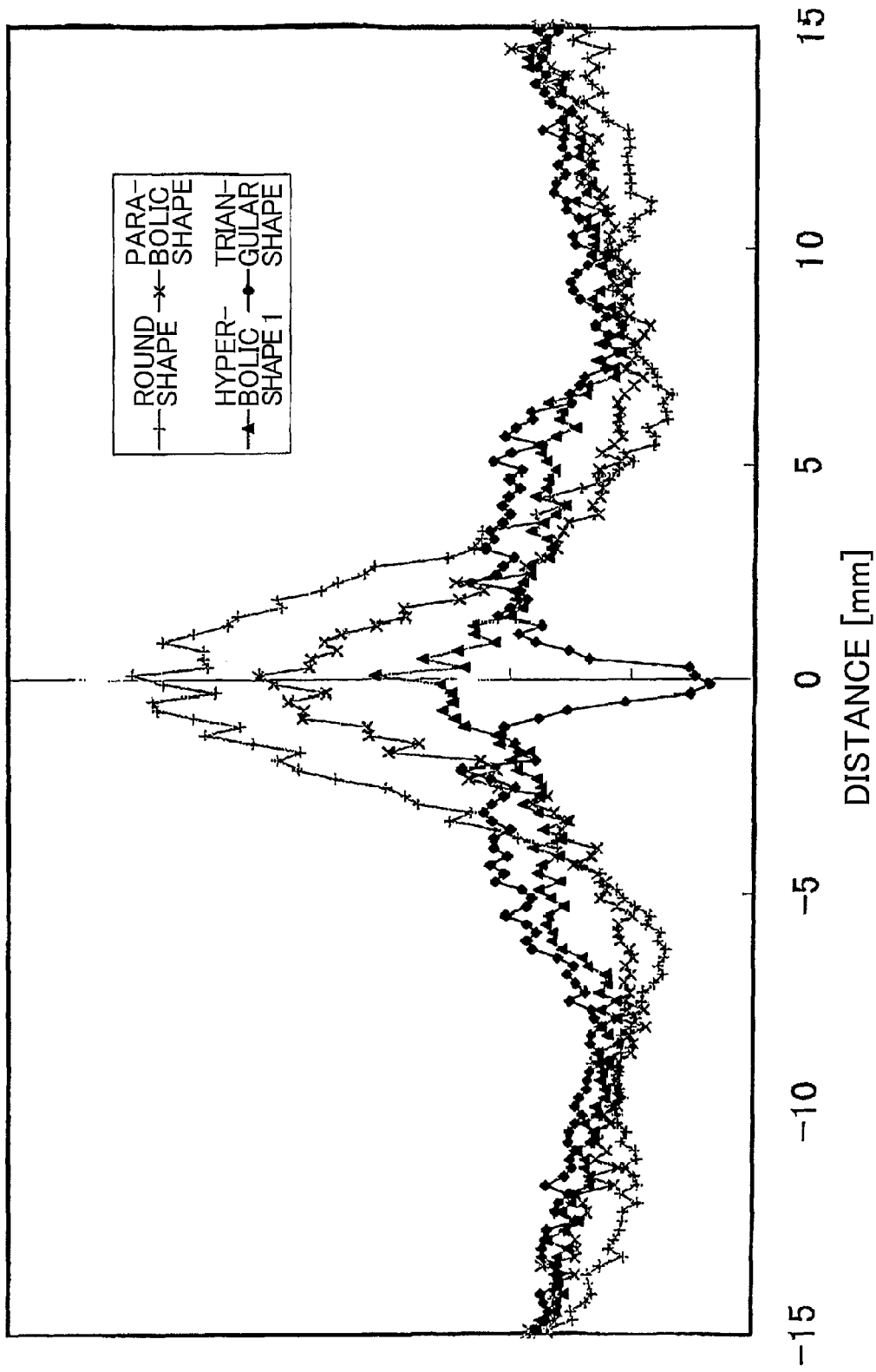
FIG. 10 is a graph showing an illuminance distribution of light emitted from a light exit surface of a light guide plate when a sectional shape of a parallel groove of the light guide plate is variously changed.

Next, the illuminance distribution of light emitted from the light exit surface of the light guide plate was examined while the sectional shape of the parallel groove of the light guide plate was variously changed. First examined were the light guide plates according to the present invention as shown in FIGS. 1A, 1B and 3 each of which had the parallel groove 18f whose sectional shape was triangular or hyperbolic. Conventional light guide plates each of which had the parallel groove 18f whose sectional shape was parabolic or semicircular were also examined. FIG. 10 shows a relative illuminance distribution on the light exit side surface of each light guide plate. In FIG. 10, the vertical axis represents the relative illuminance, while the horizontal axis represents the distance from the center position of the light guide plate (center portion of the parallel groove). Here, the relative illuminance was measured as described below.

In a state where a light source is incorporated into the light guide plate of the present invention to allow light to enter the light guide plate and exit from the light exit surface, the plate is fixed to an XY stage and an illuminometer is fixed vertically with respect to the light exit surface of the light guide plate. The illuminance is measured at a specific position of the light exit surface with the illuminometer, and illuminance information regarding the specific position of the light exit surface of the light guide plate is obtained.

Thereafter, the XY stage is moved to determine the relation between the position on the light exit surface and the illuminance thereby calculating the average value over the entire surface. The ratio obtained by dividing the illuminance at each position by the average value of the illuminance means the relative illuminance at the position.

The illuminance on one axis extending perpendicularly to the axial direction of the parallel groove can also be measured and used as a representative value to facilitate the comparison on the sectional shape.

Further, in the case of measuring the relative luminance, a luminance meter may be used instead of the illuminometer; the relative luminance distribution on the light exit side surface of the light guide plate can be obtained by use of the luminance meter.

As is apparent from FIG. 10, when the parallel groove of the light guide plate is formed into a hyperbolic shape in section, the peak value of the relative illuminance at the portion corresponding to the parallel groove is 10 or less times as large as the average value of the relative illuminance which is determined by emitted light from the inclined rear surface portion and the illuminance of light from the light exit surface is substantially even. On the other hand, in the conventional light guide plate where the parallel groove has a semicircular or parabolic sectional shape, as shown in FIG. 10, the central portion of the parallel groove, that is, the position just above the light source exhibits a higher relative illuminance, and emission lines are observed. That is, in the conventional light guide plate where the parallel groove has the semicircular or parabolic sectional shape, the illuminance on the light exit surface is not even.

Also, in the light guide plate where the parallel groove has a triangular sectional shape, the relative illuminance of the central portion is low. With the above parallel groove having the triangular sectional shape, the vertex is leveled by a predetermined width or curved with relatively small radius of curvature, so that the illuminance on the light exit surface can be made even. This process will be described below.

Figure 11:
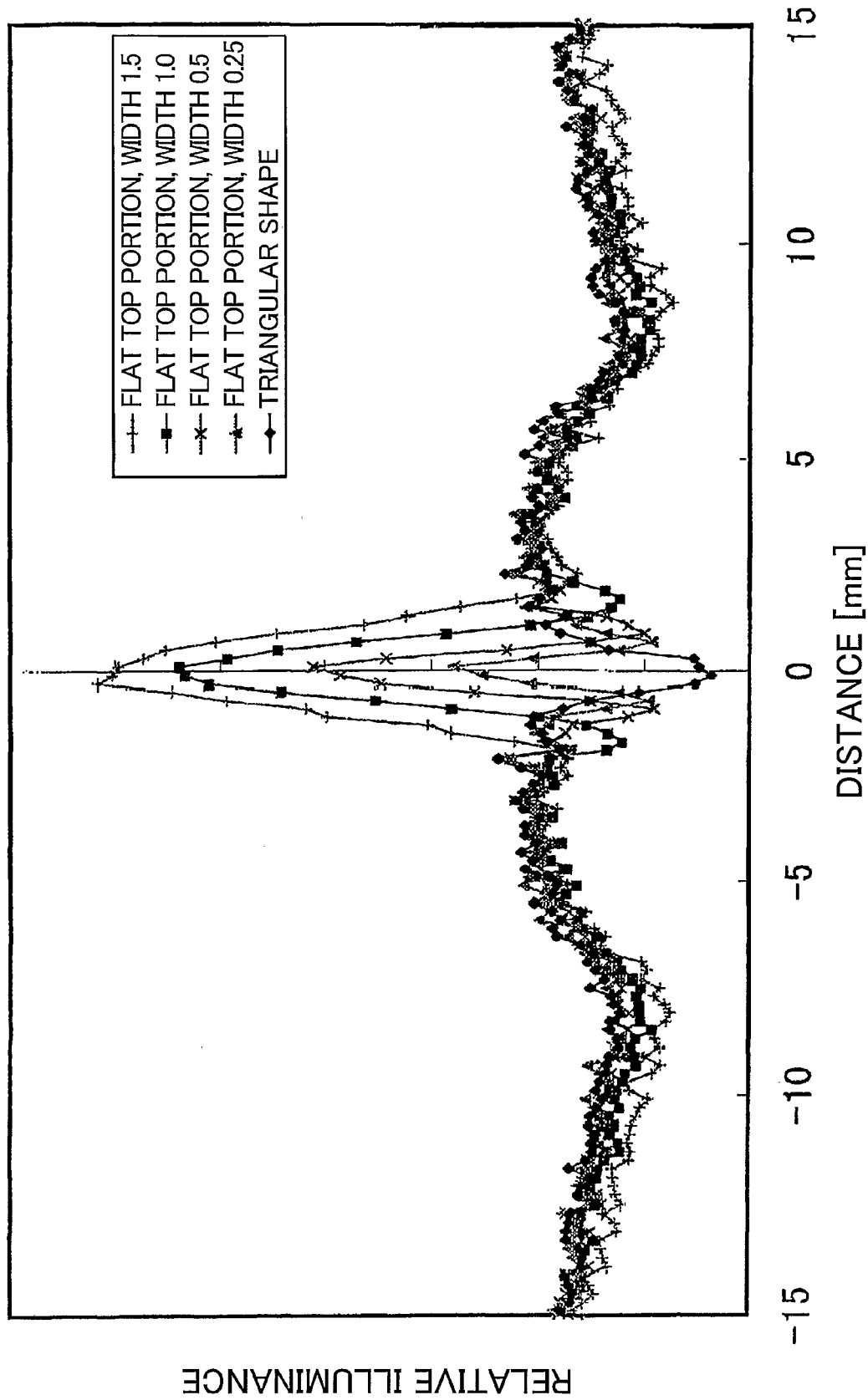
FIG. 11 is a graph showing an illuminance distribution of light emitted from a light exit surface of a light guide plate when the deepest portion of a parallel groove is leveled, and a length of the portion to be leveled is variously changed.
Figure 12A:
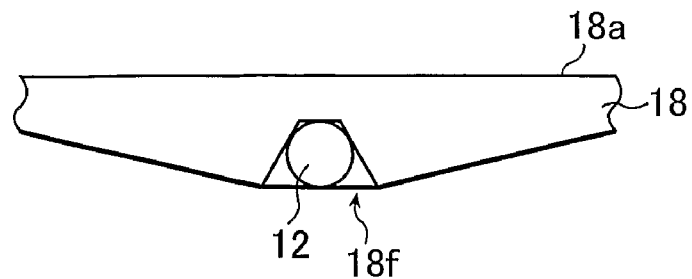
FIGS. 12A to 12D are schematic sectional views of a light guide plate having a parallel groove where the length of the leveled portion of the deepest portion is 1.5 mm, 1.0 mm, 0.5 mm, or 0.25 mm.
Figure 12B:
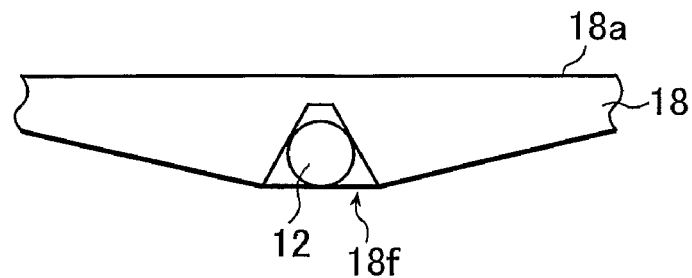
Figure 12C:
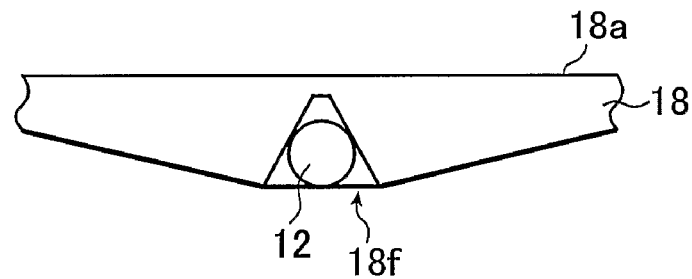
Figure 12D:
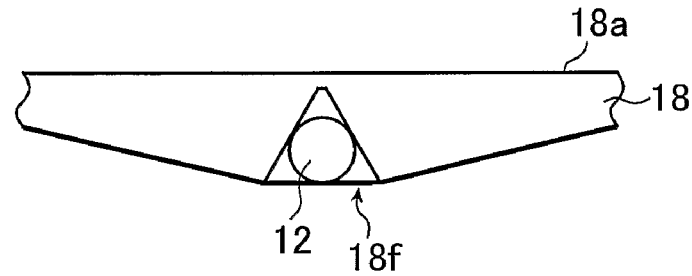
Figure 14A:
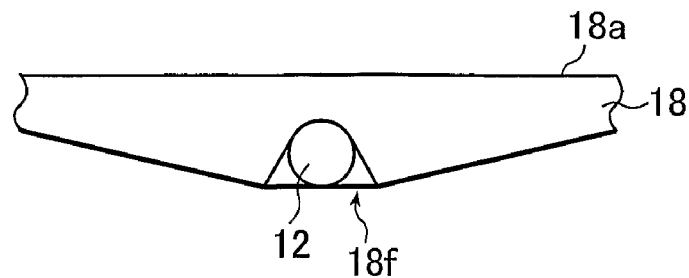
FIGS. 14A to 14D are schematic sectional views of a light guide plate where the radius of curvature at the vertex of a triangular sectional shape of a parallel groove is 0.25 mm, 0.5 mm, 1.0 mm, or 1.5 mm.
Figure 14B:
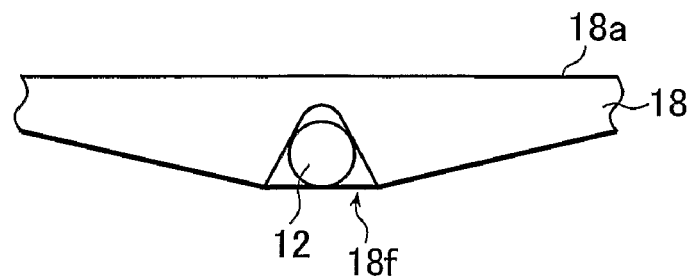
Figure 14C:
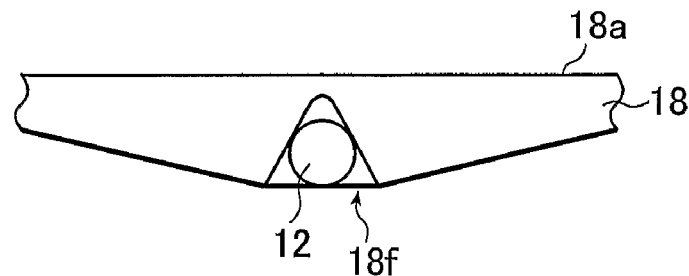
Figure 14D:
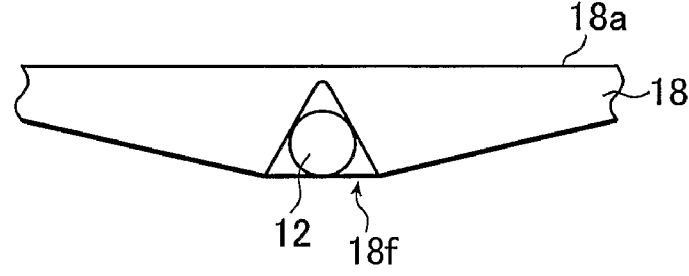

FIG. 11 shows the illuminance distribution of light emitted from the light exit surface of the light guide plate in the case where the parallel groove of the light guide plate has a triangular sectional shape, the deepest portion of the parallel groove (vertex of the triangular parallel groove) is leveled, and the length of the portion to be leveled is variously changed. In FIG. 11, the vertical axis represents the relative illuminance, while the horizontal axis represents the distance from the central portion of the parallel groove formed in the light guide plate. Here, for ease of calculation, the diameter of a cold-cathode tube is set at 3 mm, and the length of the portion to be leveled is set at 1.5 mm, 1.0 mm, 0.5 mm, or 0.25 mm. FIGS. 12A to 12D are schematic sectional views of the light guide plate having the parallel groove triangular in section, where the length of the portion to be leveled in the deepest portion is set at 1.5 mm, 1.0 mm, 0.5 mm, or 0.25 mm.

As shown in the graph of FIG. 11, the relative illuminance at the portion corresponding to the parallel groove of the light guide plate varies depending on the length of the leveled portion. Here, in the present invention, the longer leveled portion at the deepest portion of the parallel groove increases the illuminance, but an excessively leveled portion may generate an emission line. Hence, it is preferable to set the length of the portion to be leveled at 20% or less, more preferably 10% or less of the diameter of the cold-cathode tube.

FIG. 13 shows an illuminance distribution of light emitted from the light exit surface of the light guide plate when the deepest portion of the parallel groove having a triangular sectional shape is curved with a radius of curvature R and the radius of curvature of the surface to be curved is variously changed. In this example, the radius of the cold-cathode tube was set at 3 mm, and measurement was made on the light guide plate where the radius of curvature at the vertex was set at 0.25 mm, 0.5 mm, 1.0 mm, or 1.5 mm. FIGS. 14A to 14D are schematic sectional views of the light guide plate having the parallel groove triangular in section, where the radius of curvature at the vertex is set at 0.25 mm, 0.5 mm, 1.0 mm, or 1.5 mm. The graph of FIG. 13 reveals that the relative illuminance at a portion corresponding to the parallel groove of the light guide plate is changed according to the radius of curvature at the vertex of the parallel groove, and the relative illuminance is substantially even on the light exit surface of the light guide plate when the radius of curvature R at the vertex is 0.25 mm.

As will be understood from the above, the illuminance of light from the light exit surface largely depends on the shape of the end portion of the parallel groove in the light guide plate. That is, the illuminance on the light exit surface of the light guide plate can be adjusted to an optimum value and made even by merely designing the parallel groove of the light guide plate into a shape according to the present invention.

The illuminance and luminance are substantially equivalent on the light guide plate surface. Thus, it is presumed from the graphs of FIGS. 11 and 13 showing the relative illuminance that the luminance shows the same tendency as well in the present invention. Therefore, it is conceivable that the luminance on the light exit surface of the light guide plate can be also made even by designing the parallel groove of the light guide plate so as to have a shape according to the present invention.

The top (deepest portion) of the end portion of the parallel groove may be in a level shape as obtained by chamfering the top at the acute intersection so as to be symmetrical with respect to the center line of the parallel groove. Not only a rounded circular shape but also elliptical, parabolic, and hyperbolic shapes are also applicable. Further, in addition to this, the top (deepest portion) of the end portion of the parallel groove may be sanded or sand-rubbed as mentioned above to thereby reduce the peak value of the illuminance or luminance.

Based on the above, in the light guide plate according to the first mode of the first aspect of the present invention, it is determined to which extent the end portion of the parallel groove 18f of the light guide plate 18 is narrowed or tapered according to the ratio of the peak value of emission line (peak value of illuminance) observed at a portion (first portion) corresponding to the parallel groove 18f on the light exit surface 18a of the light guide plate 18 to the average value of illuminance measured at a portion other than the parallel groove 18f, that is, portion corresponding to the inclined surface 18d (second portion) To be specific, it is controlled the degree to which the end portion of the parallel groove 18f of the light guide plate 18 is narrowed or tapered according to the ratio. In this case, as in the second mode to be described below, the ratio is preferably set at 3 or less, more preferably 2 or less.

The ratio is preferably set according to the thickness of the backlight unit 2 (distance between the light exit surface 18a of the light guide plate 18 and the diffusion sheet 14), the diffusion efficiency of the diffusion sheet 14 used in the backlight unit 2 or the number of sheets, or the diffusion efficiency of the prism sheets 16, 17, and 19 or the number of sheets used. That is, in the case where the thickness of the backlight unit 2 (distance between the light exit surface 18a of the light guide plate 18 and the diffusion sheet 14) can be increased to some extent, where the diffusion efficiency of the diffusion sheet 14 used in the backlight unit 2 is high and the number of sheets used can be increased, or where the diffusion efficiency of the prism sheets 16, 17, and 19 is high, and the number of sheets used can be increased, diffusion (mixing etc.) of illumination light emitted from the light exit surface 18a of the light guide plate 18 can be sufficiently carried out, leading to a high cost. However, the ratio of the peak value of illuminance at the first portion of the light exit surface 18a of the light guide plate 18 to the average value of illuminance at the second portion of the light exit surface 18a of the light guide plate 18 can be set at a fairly large value; otherwise, cost reduction is possible but the ratio needs to be set small.

On the other hand, in the light guide plate according to the second mode of the first aspect of the present invention, the end portion of the parallel groove 18f of the light guide plate 18 is narrowed or tapered such that the peak value of illuminance at the first portion of the light exit surface 18a of the light guide plate 18 is three or less times, preferably twice or less as large as the average value of illuminance at the second portion of the light exit surface 18a of the light guide plate 18. Here, the peak value of the illuminance at the first portion of the light exit surface 18a of the light guide plate 18 is set three or less times larger than the average value of the illuminance at the second portion of the light exit surface 18a of the light guide plate 18 because the illuminance distribution of the illumination light emitted from the light exit surface 18a of the light guide plate 18 can be made evener than in the conventional case. As a result, it is unnecessary to carry out the diffusion (mixing etc.) of the illumination light emitted from the light exit surface 18a of the light guide plate 18 so much. In addition, the inexpensive diffusion sheet 14 having relatively low diffusion efficiency can be used, and the number of sheets used can be reduced. Besides, it is possible to dispense with the expensive prism sheets 16, 17, and 19, or use the inexpensive prism sheets 16, 17, and 19 having relatively low diffusion efficiency or reduce the number of sheets used.

In the light guide plate 18 according to the first aspect of the present invention, the end portion of the parallel groove 18f to be narrowed or tapered preferably form, in its sectional shape, an angle of 90 degrees or less, more preferably 60 degrees or less, the angle being obtained by combining two angles between both sides of the sectional shape and the perpendicular (X) extending from the center of the bar-like light source 12 toward the light exit surface 18a. More specifically, in the present invention, as a portion of the parallel groove 18f to be narrowed or tapered for reducing the peak value of the illuminance at the first portion of the light exit surface 18a of the guide plate 18 corresponding to the parallel groove 18f, the entire parallel groove 18f may be narrowed or tapered. However, a given end portion may be narrowed or tapered insofar as the peak value can be reduced.

The light guide plate, and the planar lighting device and liquid crystal display device provided with the light guide plate according to the present invention have been described above in detail, but the present invention is not limited to the above embodiments. Needless to say, various improvements and changes can be made without departing from the gist of the present invention.

Figure 15:
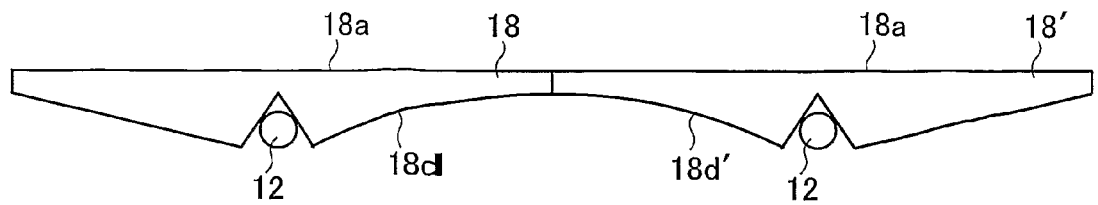
FIG. 15 is a schematic sectional view of light guide plates of the present invention arranged in line.

For example, in the present invention, as shown in FIG. 15, plural light guide plates 18 can be arranged in line in such a manner that the light exit surfaces 18a of the light guide plates 18 are flush with each other to thereby constitute a large-size light guide plate. When the light guide plates 18 are arranged in line in this way, the inclination angle of the inclined surface 18d of the light guide plate 18 can be adjusted such that the respective tangents at the contact points of the inclined surfaces 18d and 18d' of the light guide plates 18 and 18' connecting with each other do not cross each other, that is, a smooth flat or curved surface is formed in the portion where the inclined surfaces 18d and 18d' are connected with each other. In the light guide plate shown in FIG. 15, a surface defined by the inclined surfaces 18d and 18d' of the light guide plates 18 and 18' is formed in an arch shape.

Using the above light guide plate having a large-size light exit surface offers the backlight unit having a large-size light illumination surface. Hence, it can be applied to the liquid crystal display device having a large-size display screen, in particular, a wall-hung liquid crystal display device such as a wall-hung TV.

In order to connect the light guide plates according to the present invention into a single unit to form a large-size light guide plate as mentioned above, the light guide plates of the present invention separately formed may be arranged such that thin portions are brought into contact with each other or bonded to each other. Two or more light guide plates of the present invention which are connected with each other are preferably formed into a unit for enhancing the evenness of the light to be emitted.

From the viewpoint of production efficiency, the light guide units of the present invention which are necessary for forming a light guide plate having a desired screen size are preferably integrated into a unit.

Figure 16A:
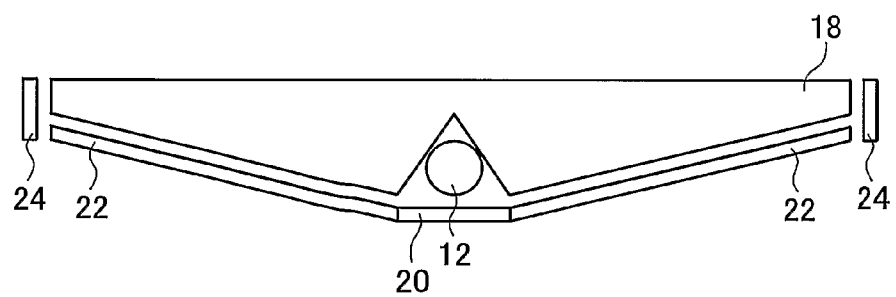
FIG. 16A shows a structural example where a reflection plates are disposed outside lateral surfaces of a light guide plate of the present invention.
Figure 16B:
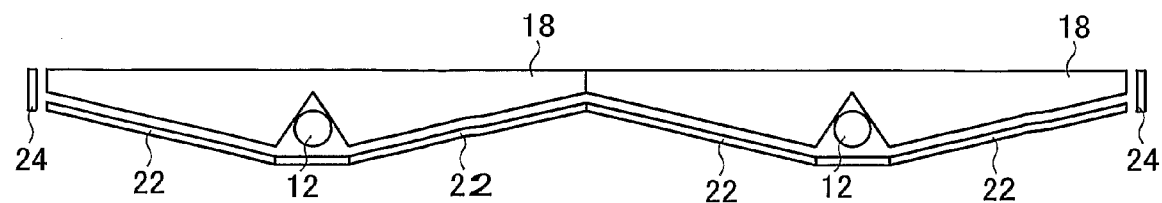
FIG. 16B shows a structural example where reflection plates are disposed outside lateral surfaces of the outermost light guide plates when the light guide plates of the present invention are arranged in line.
Figure 18:
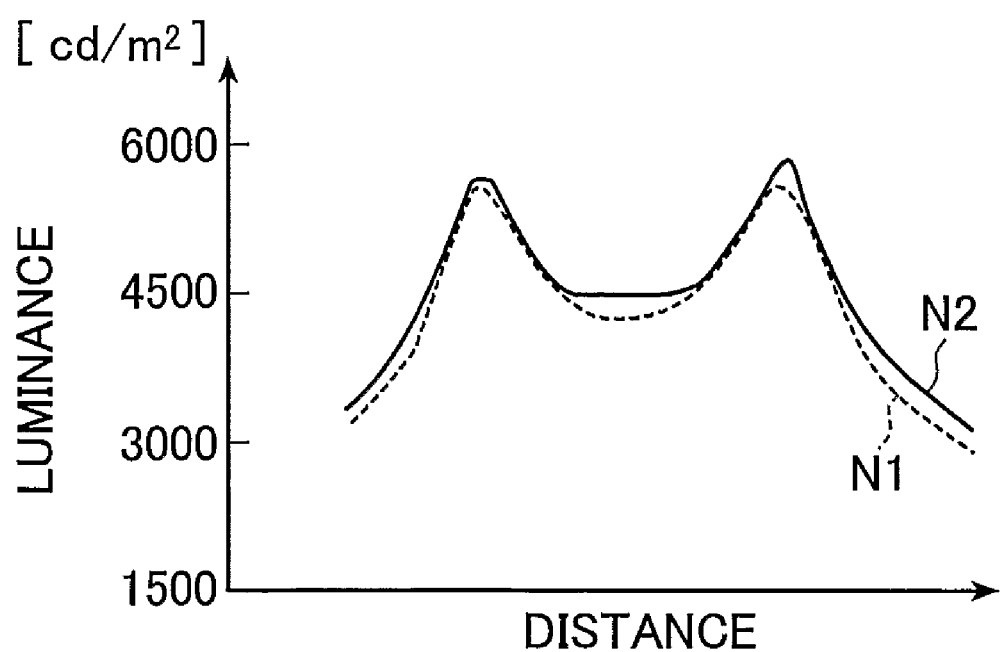
FIG. 18 is a graph showing luminance on the light exit surface of the light guide plate of the area light source device shown in FIG. 17.

Also, in the light guide plate of the present invention, as shown in FIG. 16A, a reflection plate 24 may be arranged outside each lateral surface of the light guide plate 18 in consideration of the area of the side surface. In the case where more than one light guide plate 18 is arranged, the reflection plates 24 are arranged, as shown in FIG. 16B, outside both lateral surfaces of the outermost light guide plates 18. By arranging the reflection plates 24 outside the lateral surfaces, light can be kept from leaking from the lateral surfaces of the light guide plate 18, and the use efficiency of light can be further improved. The reflection plate 24 may be formed of the same material as that of the aforementioned reflective sheet or reflector.

INDUSTRIAL APPLICABILITY

The light guide plate of the present invention is capable of providing a thin and lightweight light guide plate that emits evener illumination light having higher luminance from the light exit surface, thereby, the size of a light exit surface of the light guide plate can be made larger. Therefore, the light guide plate of the present invention is applicable to a planar lighting device requiring to emit evener illumination light with higher luminance and/or to have a larger-size illumination surface.

The planar lighting device of the present invention can be manufactured at lower cost and emit evener illumination light with higher luminance, allows a large-size illumination surface, and is applicable to a liquid crystal display device having a large-size display screen.

The liquid crystal display device of the present invention can be manufactured at lower cost, ensures evener display with higher luminance and allows a larger-size display screen and/or can be hung on a wall such as a wall-hung TV.

The invention claimed is:

1. A transparent light guide plate, comprising:
 a rectangular light exit surface;
 a thick portion positioned at substantially a central portion of said rectangular light exit surface in parallel with opposing two sides of said rectangular light exit surface;
 thin edge portions formed in parallel on both sides of said thick portion;
 a parallel groove which accommodates a bar-like light source and is formed at substantially a center of said thick portion in parallel with said opposing two sides; and
 inclined rear portions which are symmetrical with respect to a plane including a central axis of said bar-like light source and perpendicular to said rectangular light exit surface, and whose thickness is reduced from said thick portion toward said thin edge portions in a direction perpendicular to said opposing two sides to thereby form inclined rear surfaces on both sides of said parallel groove,
 wherein an end portion of said parallel groove is narrowed toward said rectangular light exit surface symmetrically with respect to a center line of said parallel groove perpendicular to said rectangular light exit surface in a sectional shape of said parallel groove in said direction perpendicular to said rectangular light exit surface, in accordance with a ratio of a peak value of illuminance or luminance of emitted light from said bar-like light source accommodated in said parallel groove at a first portion of said rectangular light exit surface corresponding to said parallel groove to an average value of said illuminance or luminance of said emitted light at second portions corresponding to said inclined rear portions, and
 said light guide plate is formed of a single material with a uniform index of refraction.

2. The light guide plate according to claim 1, wherein said end portion of said parallel groove is symmetrically narrowed such that a peak value of relative illuminance or relative luminance at said first portion of said rectangular light exit surface is three or less times as large as an average value of said relative illuminance or relative luminance at said second portions of said rectangular light exit surface.

3. A transparent light guide plate, comprising:
a rectangular light exit surface;
a thick portion positioned at substantially a central portion of said rectangular light exit surface in parallel with opposing two sides of said rectangular light exit surface;
thin edge portions formed in parallel on both sides of said thick portion;
a parallel groove which accommodates a bar-like light source and is formed at substantially a center of said thick portion in parallel with said opposing two sides; and
inclined rear portions which are symmetrical with respect to a plane including a central axis of said bar-like light source and perpendicular to said rectangular light exit surface, and whose thickness is reduced from said thick portion toward said thin edge portions in a direction perpendicular to said opposing two sides to thereby form inclined rear surfaces on both sides of said parallel groove,
wherein an end portion of said parallel groove is narrowed toward said rectangular light exit surface symmetrically with respect to a center line of said parallel groove perpendicular to said rectangular light exit surface in a sectional shape of said parallel groove in said direction perpendicular to said rectangular light exit surface, in such a manner that a peak value of illuminance or luminance of emitted light from said bar-like light source accommodated in said parallel groove at a first portion of said rectangular light exit surface corresponding to said parallel groove is three or less times as large as an average value of said illuminance or luminance of said emitted light at a second portion corresponding to said inclined rear portions, and
said light guide plate is formed of a single material with a uniform index of refraction.

4. The light guide plate according to claim 2, wherein the peak of relative illuminance or relative luminance at said first portion of said rectangular light exit surface is twice or less as large as said average value of said relative illuminance or relative luminance at said second portion of said rectangular light exit surface.

5. The light guide plate according to claim 1, wherein said end portion forms an angle of 90 degrees or less, said angle being obtained by combining two angles between both sides of said sectional shape of said parallel groove and a perpendicular line extending from a center of said bar-like light source toward said rectangular light exit surface.

6. The light guide plate according to claim 1, wherein said end portion forms an angle of 60 degrees or less, said angle being obtained by combining two angles between both sides of said sectional shape of said parallel groove and a perpendicular line extending from a center of said bar-like light source toward said rectangular light exit surface.

7. The light guide plate according to claim 1, wherein said sectional shape of at least said end portion of said parallel groove is defined by part of two straight or curved lines symmetrical with respect to said center line of said parallel groove, which cross each other at an intersection as a peak.

8. The light guide plate according to claim 7, wherein said two curved lines defining said sectional shape of at least said end portion of said parallel groove are convex or concave with respect to said center line of said parallel groove.

9. The light guide plate according to claim 7, wherein said two curved lines defining said sectional shape of at least said end portion of said parallel groove can be approximated by a tenth-order mathematical function and are convex or concave with respect to said center line of said parallel groove.

10. The light guide plate according to claim 7, wherein said two curved lines defining said sectional shape of at least said end portion of said parallel groove or said sectional shape of said parallel groove comprise part of circular, elliptical, parabolic, or hyperbolic lines, which are convex or concave with respect to said center line of said parallel groove.

11. The light guide plate according to claim 1, wherein said sectional shape of at least said end portion of said parallel groove or said sectional shape of said parallel groove is triangular.

12. The light guide plate according to claim 7, wherein said sectional shape at a top of said end portion of said parallel groove is defined by said two straight or curved lines symmetrical with respect to said center line cross each other and a straight or curved line symmetrical with respect to said center line which is connected to said two straight or curved lines before said two straight or curved lines cross each other.

13. The light guide plate according to claim 12, wherein said sectional shape at said top of said end portion of said parallel groove has a portion parallel with said rectangular light exit surface where said intersection as the peak is chamfered.

14. The light guide plate according to claim 12, wherein said sectional shape of at least said end portion of said parallel groove or said sectional shape of said parallel groove is triangular, and said sectional shape at said top of said end portion of said parallel groove is a trapezoidal shape symmetrical with respect to said center line.

15. The light guide plate according to claim 12, wherein said sectional shape at said top of said end portion of said parallel groove is a curved shape symmetrical with respect to said center line and convex or concave with respect to said rectangular light exit surface.

16. The light guide plate according to claim 12, wherein said sectional shape at said top of said end portion of said parallel groove is a circular, elliptical, parabolic, or hyperbolic shape obtained by rounding said intersection as the peak symmetrically with respect to said center line.

17. The light guide plate according to claim 1, wherein said sectional shape of at least said end portion of said parallel groove is defined by part of a elliptical or hyperbolic line.

18. The light guide plate according to claim 1, wherein said top of said end portion of said parallel groove is sanded.

19. The light guide plate according to claim 1, wherein a halftone dot pattern is formed in a portion of said rectangular light exit surface corresponding to said top of said end portion of said parallel groove.

20. A light guide plate formed from two or more light guide plates, each comprising:
a rectangular light exit surface;
a thick portion positioned at substantially a central portion of said rectangular light exit surface in parallel with opposing two sides of said rectangular light exit surface;
thin edge portions formed in parallel on both sides of said thick portion;
a parallel groove which accommodates a bar-like light source and is formed at substantially a center of said thick portion in parallel with said opposing two sides; and
inclined rear portions which are symmetrical with respect to a plane including a central axis of said bar-like light source and perpendicular to said rectangular light exit surface, and whose thickness is reduced from said thick portion toward said thin edge portions in a direction perpendicular to said opposing two sides to thereby form inclined rear surfaces on both sides of said parallel groove, wherein an end portion of said parallel groove is narrowed toward said rectangular light exit surface symmetrically with respect to a center line of said parallel groove perpendicular to said rectangular light exit surface in a sectional shape of said parallel groove in said direction perpendicular to said rectangular light exit surface, in accordance with a ratio of a peak value of illuminance or luminance of emitted light from said bar-like light source accommodated in said parallel groove at a first portion of said rectangular light exit surface corresponding to said parallel groove to an average value of said illuminance or luminance of said emitted light at second portions corresponding to said inclined rear portions, said two or more light guide plates are connected with each other at said thin edge portions thereof, and said two or more light guide plates are formed of a single material with a uniform index of refraction.

21. A planar lighting device comprising:
a light guide plate, comprising:
   a rectangular light exit surface;
   a thick portion positioned at substantially a central portion of said rectangular light exit surface in parallel with opposing two sides of said rectangular light exit surface;
   thin edge portions formed in parallel on both sides of said thick portion;
   a parallel groove which accommodates a bar-like light source and is formed at substantially a center of said thick portion in parallel with said opposing two sides; and
   inclined rear portions which are symmetrical with respect to a plane including a central axis of said bar-like light source and perpendicular to said rectangular light exit surface, and whose thickness is reduced from said thick portion toward said thin edge portions in a direction perpendicular to said opposing two sides to thereby form inclined rear surfaces on both sides of said parallel groove,
   wherein an end portion of said parallel groove is narrowed toward said rectangular light exit surface symmetrically with respect to a center line of said parallel groove perpendicular to said rectangular light exit surface in a sectional shape of said parallel groove in said direction perpendicular to said rectangular light exit surface, in accordance with a ratio of a peak value of illuminance or luminance of emitted light from said bar-like light source accommodated in said parallel groove at a first portion of said rectangular light exit surface corresponding to said parallel groove to an average value of said illuminance or luminance of said emitted light at second portions corresponding to said inclined rear portions;
a bar-like light source accommodated in said parallel groove of said light guide plate;
a reflector provided behind said bar-like light source to cover said parallel groove;
a reflective sheet provided on said inclined rear surfaces of said inclined rear portions on both sides of said thick portion of said light guide plate;
a diffusion sheet arranged on said rectangular light exit surface of said light guide plate, and
said light guide plate is formed of a single material with a uniform index of refraction.

22. The planar lighting device according to claim 21, further comprising a prism sheet arranged between said rectangular light exit surface of said light guide plate and said diffusion sheet.

23. The planar lighting device according to claim 21, wherein a ratio of a peak value of relative illuminance or luminance at a first portion of said rectangular light exit surface of said light guide plate to an average value of relative illuminance or luminance at a second portion of said rectangular light exit surface is determined in accordance with a permissible gap between said rectangular light exit surface of said light guide plate and said diffusion sheet, or a permissible thickness of said planar lighting device.

24. A liquid crystal display device, comprising:
a backlight unit including a planar lighting device;
a liquid crystal display panel arranged on a light exit surface side of said backlight unit; and
a drive unit driving said backlight unit and said liquid crystal display panel,
wherein said planar lighting device comprises:
a light guide plate, comprising:
   a rectangular light exit surface;
   a thick portion positioned at substantially a central portion of said rectangular light exit surface in parallel with opposing two sides of said rectangular light exit surface;
   thin edge portions formed in parallel on both sides of said thick portion;
   a parallel groove which accommodates a bar-like light source and is formed at substantially a center of said thick portion in parallel with said opposing two sides; and
   inclined rear portions which are symmetrical with respect to a plane including a central axis of said bar-like light source and perpendicular to said rectangular light exit surface, and whose thickness is reduced from said thick portion toward said thin edge portions in a direction perpendicular to said opposing two sides to thereby form inclined rear surfaces on both sides of said parallel groove,
   wherein an end portion of said parallel groove is narrowed toward said rectangular light exit surface symmetrically with respect to a center line of said parallel groove perpendicular to said rectangular light exit surface in a sectional shape of said parallel groove in said direction perpendicular to said rectangular light exit surface, in accordance with a ratio of a peak value of illuminance or luminance of emitted light from said bar-like light source accommodated in said parallel groove at a first portion of said rectangular light exit surface corresponding to said parallel groove to an average value of said illuminance or luminance of said emitted light at second portions corresponding to said inclined rear portions;
a bar-like light source accommodated in said parallel groove of said light guide plate;
a reflector provided behind said bar-like light source to cover said parallel groove;
a reflective sheet provided on said inclined rear surfaces of said inclined rear portions on both sides of said thick portion of said light guide plate;
a diffusion sheet arranged on said rectangular light exit surface of said light guide plate, and
said light guide plate is formed of a single material with a uniform index of refraction.

25. A method of forming a transparent light guide plate, wherein the transparent light guide plate comprises a rectangular light exit surface, the method comprising:
- forming a thick portion positioned at substantially a central portion of said rectangular light exit surface in parallel with opposing two sides of said rectangular light exit surface;
- forming thin edge portions in parallel on both sides of said thick portion;
- forming a parallel groove which accommodates a bar-like light source and is formed at substantially a center of said thick portion in parallel with said opposing two sides; and
- forming inclined rear portions which are symmetrical with respect to a plane including a central axis of said bar-like light source and perpendicular to said rectangular light exit surface, and whose thickness is reduced from said thick portion toward said thin edge portions in a direction perpendicular to said opposing two sides to thereby form inclined rear surfaces on both sides of said parallel groove; and
- narrowing an end portion of said parallel groove toward said rectangular light exit surface symmetrically with respect to a center line of said parallel groove perpendicular to said rectangular light exit surface in a sectional shape of said parallel groove in said direction perpendicular to said rectangular light exit surface, based on a ratio of a peak value of illuminance or luminance of emitted light from said bar-like light source accommodated in said parallel groove at a first portion of said rectangular light exit surface corresponding to said parallel groove to an average value of said illuminance or luminance of said emitted light at second portions corresponding to said inclined rear portions.

26. The method according to claim 25, wherein said peak value of relative illuminance or relative luminance at said first portion of said rectangular light exit surface is three or less times as large as said average value of said relative illuminance or relative luminance at said second portions of said rectangular light exit surface.

* * * * *